US011562532B2

(12) United States Patent
Kushibe et al.

(10) Patent No.: US 11,562,532 B2
(45) Date of Patent: Jan. 24, 2023

(54) SITE SPECIFYING DEVICE, SITE SPECIFYING METHOD, AND STORAGE MEDIUM

(71) Applicant: FUJITSU LIMITED, Kawasaki (JP)

(72) Inventors: Daisuke Kushibe, Kawasaki (JP); Masahiro Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 30 days.

(21) Appl. No.: 16/850,257

(22) Filed: Apr. 16, 2020

(65) Prior Publication Data
US 2020/0342663 A1 Oct. 29, 2020

(30) Foreign Application Priority Data

Apr. 24, 2019 (JP) .............................. JP2019-082817

(51) Int. Cl.
*G06T 17/10* (2006.01)
*G06F 3/04855* (2022.01)
(Continued)

(52) U.S. Cl.
CPC .......... *G06T 17/10* (2013.01); *G06F 3/04855* (2013.01); *G06T 7/0014* (2013.01);
(Continued)

(58) Field of Classification Search
CPC ..... G06F 3/04855; G06T 17/10; G06T 19/20; G06T 2200/24; G06T 2207/10028;
(Continued)

(56) References Cited

U.S. PATENT DOCUMENTS

2005/0168461 A1* 8/2005 Acosta .................... G06T 15/08
345/419
2010/0076305 A1* 3/2010 Maier-Hein ........... A61B 90/37
600/426
(Continued)

FOREIGN PATENT DOCUMENTS

EP 2672453 A2 12/2013
JP 2013-254445 A 12/2013
(Continued)

OTHER PUBLICATIONS

Kei Fujisawa et al., "Visualization and Development of Cerebral Circulation Simulation Taking Account of Cardiovascular Circulatory System", Seisan-Kenkyu, Institute of Industrial Science, The University of Tokyo, vol. 65, No. 3, p. 281-284, May 1, 2013 (Total 14 pages).

*Primary Examiner* — Sing-Wai Wu
(74) *Attorney, Agent, or Firm* — Fujitsu Patent Center

(57) ABSTRACT

A site specifying device, includes a memory; and a processor coupled to the memory and the processor configured to: store three-dimensional model data indicating a three-dimensional model of an object, display the three-dimensional model based on the three-dimensional model data, and select from the three-dimensional model a site in a range of a depth specified toward an inner side of the three-dimensional model from a region surrounded by a closed curve on a surface of the three-dimensional model according to an input of the closed curve to the surface of the displayed three-dimensional model and an input to specify the depth from the surface of the three-dimensional model.

13 Claims, 21 Drawing Sheets

(51) Int. Cl.
    *G06T 7/00*       (2017.01)
    *G06T 19/20*     (2011.01)

(52) U.S. Cl.
    CPC .... *G06T 19/20* (2013.01); *G06T 2207/10028* (2013.01); *G06T 2207/30048* (2013.01)

(58) Field of Classification Search
    CPC ....... G06T 2207/30048; G06T 2210/41; G06T 2219/2021; G06T 7/0014
    See application file for complete search history.

(56) References Cited

U.S. PATENT DOCUMENTS

| | | | | |
|---|---|---|---|---|
| 2010/0225642 | A1* | 9/2010 | Murray | G06T 19/00 |
| | | | | 345/419 |
| 2010/0266176 | A1* | 10/2010 | Masumoto | G06T 15/08 |
| | | | | 382/128 |
| 2012/0200560 | A1* | 8/2012 | Masumoto | G06T 19/20 |
| | | | | 345/419 |
| 2014/0260668 | A1* | 9/2014 | Liu | G01F 1/662 |
| | | | | 73/861.28 |
| 2019/0035161 | A1 | 1/2019 | Watanabe et al. | |
| 2020/0077895 | A1* | 3/2020 | Honma | A61B 5/0044 |

FOREIGN PATENT DOCUMENTS

| | | | | |
|---|---|---|---|---|
| JP | 2016-509508 | A | 3/2016 | |
| JP | 2019-028574 | A | 2/2019 | |
| WO | 2014/115151 | A1 | 7/2014 | |
| WO | WO-2018212230 | A1 * | 11/2018 | ............... A61B 8/08 |

\* cited by examiner

FIG. 5

THREE-DIMENSIONAL MODEL DATA — 111

111a

| NODE NUMBER | COORDINATES |
|---|---|
| 1 | 0.00 0.00 0.00 |
| 2 | 0.00 0.00 0.50 |
| ⋮ | ⋮ |
| $N_{nodes}$ | 1.00 2.00 3.00 |

111b

| ELEMENT NUMBER | NODE NUMBER |
|---|---|
| 1 | 1,2,3,4 |
| 2 | 2,3,4,5 |
| ⋮ | ⋮ |
| $N_{mesh}$ | $N_i, N_j, N_k, N_l$ |

FIG. 17

| ELEMENT NUMBER | ELEMENT TYPE | NODE NUMBER | NODE NUMBER | NODE NUMBER | NODE NUMBER |
|---|---|---|---|---|---|
| 12552 | tet | 17125 | 28031 | | |
| 12553 | tet | 28133 | 30420 | 17730 | |
| 12554 | tet | 10751 | 30429 | 28133 | 28031 |
| 12555 | tet | 17726 | 28136 | 28146 | 30419 |
| 12556 | tet | 17744 | 30443 | 30422 | 30428 |
| 12557 | tet | 33327 | 1722 | 28125 | 1727 |
| 12558 | tet | 30422 | 30428 | 30443 | 28125 |
| 12559 | tet | 30419 | 30428 | 30422 | 28137 |
| 12560 | tet | 17744 | 33214 | 30428 | 30419 |
| 12561 | tet | 28125 | 30422 | 30428 | 28137 |
| 12562 | tet | 28134 | 30420 | 17731 | 28164 |
| 12563 | tet | 33327 | 30430 | 28126 | 28130 |
| 12564 | tet | 30457 | 30445 | 33212 | |
| 12565 | tet | 30445 | 30429 | 30422 | |
| 12566 | tet | 30457 | 30442 | | |

50

SITE SPECIFYING DEVICE, SITE SPECIFYING METHOD, AND STORAGE MEDIUM

CROSS-REFERENCE TO RELATED APPLICATION

This application is based upon and claims the benefit of priority of the prior Japanese Patent Application No. 2019-82817, filed on Apr. 24, 2019, the entire contents of which are incorporated herein by reference.

FIELD

The embodiments discussed herein are related to a site specifying device, a site specifying method, and a storage medium.

BACKGROUND

A three-dimensional model created using a computer may be used in various fields. For example, using a three-dimensional model of an object having a complicated structure, the computer may simulate movement of the object and analyze characteristics of the object. The simulation includes, for example, a heart simulation that reproduces a behavior of the heart using a three-dimensional model of the heart.

In a case of performing the simulation using the three-dimensional model, a physical property value indicating a physical property is set for every site of the object represented by the three-dimensional model. Therefore, in order to perform the simulation with high accuracy, a site having a specific physical property value is specified on the three-dimensional model. For example, in a case where there is an infarction site on the myocardium of the heart, the physical property value of the infarction site is different from that of other portions of the myocardium. In a case of specifying the infarction site of the myocardium in the heart, a user specifies a region corresponding to the infarction site in the three-dimensional model including not only a portion appearing on a surface of the myocardium but also a portion buried in the myocardium of the infarction site.

As a technology related to the simulation using the three-dimensional model, for example, a drawing program for facilitating specification of a disease site in an organ is proposed. Furthermore, a method is proposed for determining a position of an object (for example, tissue, nerve, and cancer) having a desired shape based on a functional image obtained from a functional imaging modality of a patient's in vivo volume. A specifying device that efficiently specifies the myocardial infarction site is also proposed. Moreover, a proposal is made regarding visualization of a cerebral blood flow simulation taking account of general circulation. As the related art, for example, Japanese Laid-open Patent Publication No. 2013-254445, Japanese National Publication of International Patent Application No. 2016-509508, Japanese Laid-open Patent Publication No. 2019-28574, FUJISAWA, Kei, LIANG fuyou, KOBAYASHI, Masaharu, YAMADA, Shigeki, TAKAGI, Shu, and OSHIMA, Marie "Visualization and Development of Cerebral Circulation Simulation Taking Account of Cardiovascular Circulatory System", *SEISAN-KENKYU*, Institute of Industrial Science, The University of Tokyo, Vol. 65, No. 3, p. 281-284, May 1, 2013, and the like are disclosed.

SUMMARY

According to an aspect of the embodiments, a site specifying device, includes a memory; and a processor coupled to the memory and the processor configured to: store three-dimensional model data indicating a three-dimensional model of an object, display the three-dimensional model based on the three-dimensional model data, and select from the three-dimensional model a site in a range of a depth specified toward an inner side of the three-dimensional model from a region surrounded by a closed curve on a surface of the three-dimensional model according to an input of the closed curve to the surface of the displayed three-dimensional model and an input to specify the depth from the surface of the three-dimensional model.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a view illustrating an example of three-dimensional model data of the heart;

FIG. 17 is a view illustrating an example of an element list;

DESCRIPTION OF EMBODIMENTS

In a case where a user grasps a site a part of which is exposed to a surface of an object but other parts of which are buried in the object based on a stereoscopic positional relationship of the object, the user is not able to easily specify a region of the site on a three-dimensional model. For example, a computer may allow the user to specify a range of the site on a cross-sectional view of the three-dimensional model or a plan view obtained by two-dimensionally mapping/developing a surface of the three-dimensional model. In this case, although the user grasps the region occupied by the site based on the stereoscopic positional relationship of the object, the user replaces the region occupied by the site with the range on the plane to specify, so that it is not easy to specify a correct range. In view of the above, it is desirable to be able to easily specify the region on the three-dimensional model of the site a part of which is buried in the object.

Hereinafter, embodiments are described with reference to the drawings. Note that, each of embodiments may be implemented in combination within a scope without contradiction.

First Embodiment

First, a first embodiment is described.

Figure 1:
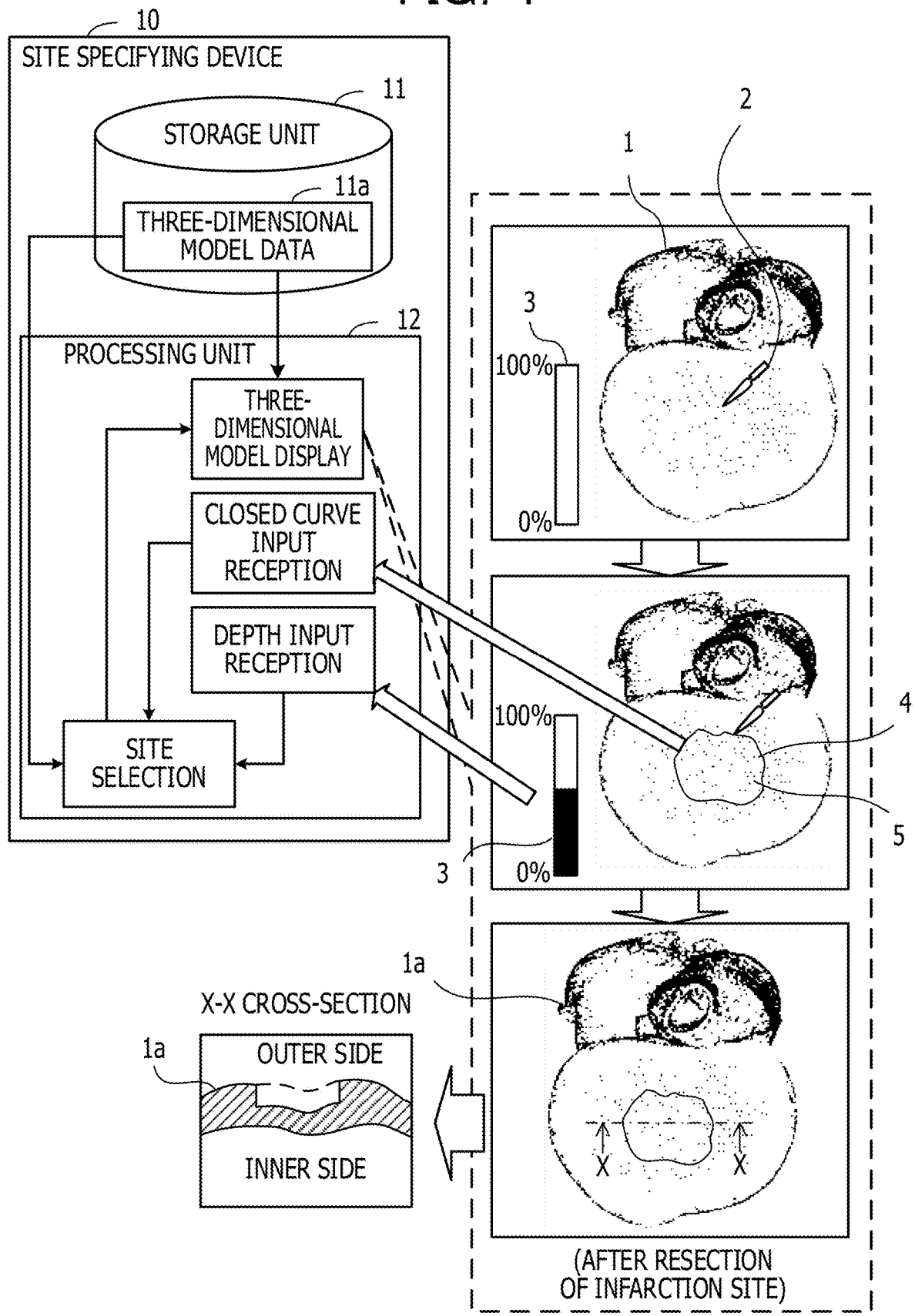
FIG. 1 is a view illustrating an example of a site selecting method according to a first embodiment.

FIG. 1 is a view illustrating an example of a site selecting method according to the first embodiment. In the example of FIG. 1, a site specifying device 10 performs the site selecting method. The site specifying device 10 may execute a site selecting program in which a procedure of the site selecting method is described, for example, thereby performing the site selecting method.

The site specifying device 10 includes a storage unit 11 and a processing unit 12. The storage unit 11 is, for example, a memory or a storage device included in the site specifying device 10. The processing unit 12 is, for example, a processor or an arithmetic circuit included in the site specifying device 10.

The storage unit 11 stores three-dimensional model data 11a Indicating a three-dimensional model 1 of an object.

The processing unit 12 selects a site in a range of a predetermined depth from a surface of the three-dimensional model 1 based on the three-dimensional model data 11a stored in the storage unit 11. For example, the processing unit 12 displays the three-dimensional model 1 based on the three-dimensional model data 11a.

Next, the processing unit 12 receives an input of a closed curve 4 to the surface of the displayed three-dimensional model 1 and an input to specify the depth from the surface of the three-dimensional model 1. For example, the user operates a mouse to move a mouse cursor 2 so as to draw the closed curve 4 on the surface of the three-dimensional model 1. The processing unit 12 obtains a movement path of the mouse cursor 2 as the input of the closed curve 4.

The processing unit 12 may receive the input to specify a depth amount based on a thickness of the three-dimensional model 1 at a point in a region 5 surrounded by the closed curve 4. In this case, the processing unit 12 calculates the thickness of the three-dimensional model 1 in a normal direction at the point in the region 5, and receives an input of a ratio of the depth to the thickness. Then, the processing unit 12 determines the depth based on the thickness and the ratio.

The processing unit 12 may also receive the input to specify the depth by using, for example, a bar 3 indicating the depth. In that case, the processing unit 12 displays the bar 3 indicating the depth. Then, the processing unit 12 changes a length of the bar 3 according to a rotational amount of a mouse wheel, and determines the depth according to the length of the bar 3. For example, in a case where the length of the bar 3 indicates a ratio to the thickness of the three-dimensional model 1, the processing unit 12 multiplies the thickness of the three-dimensional model 1 by the ratio indicated by the length of the bar 3, thereby calculating the depth.

Then, the processing unit 12 selects from the three-dimensional model 1 the site in the range of the specified depth to the inside of the three-dimensional model 1 from the region 5 surrounded by the closed curve 4 on the surface of the three-dimensional model 1 according to the input of the closed curve 4 and the input to specify the depth. For example, in a case where the three-dimensional model data 11a represents the three-dimensional model 1 by a set of polyhedral elements, the processing unit 12 outputs a list of the elements included in the site selected from the three-dimensional model data 11a.

Specifically, for example, the three-dimensional model data 11a may represent the three-dimensional model 1 by a plurality of nodes positions of which in a three-dimensional space are set and a set of polyhedral elements in which nodes indicating positions of vertices are set. The processing unit 12 generates a sphere a radius of which equals to a distance of the depth centered on each of the nodes included in the region 5, and includes the elements having the nodes in the sphere in the list.

The processing unit 12 may also generate a normal line passing through each of a plurality of points on the closed curve 4 and include the elements included in the sphere and in a closed region surrounded by a surface provided between adjacent normal lines and the surface of the three-dimensional model 1 in the list.

The processing unit 12 may display, for example, a shape obtained by cutting the selected site from the three-dimensional model 1. In a case where the three-dimensional model 1 is a model of the heart and the selected site is a myocardial infarction site, the processing unit 12 may display the three-dimensional model 1 having a shape of the heart after the infarction site is resected. FIG. 1 illustrates a three-dimensional model 1a obtained after the processing unit 12 selects the infarction site from the three-dimensional model 1 of the heart and the infarction site is resected. FIG. 1 also illustrates an X-X cross-section in a resected portion of the infarction site next to a display example of the three-dimensional model 1a. As illustrated in the X-X cross-section, the three-dimensional model 1a has a shape in which a portion of the selected site (Infarction site) is missing.

According to such site specifying device 10, it becomes possible to easily specify the region on the three-dimensional model 1 of the site a part of which is buried in the object only by inputting the closed curve 4 and the specification of the depth. For example, in a case where the three-dimensional model 1 has a complicated curved surface shape, a shape of the site buried at a predetermined depth from the surface also has a complicated curved surface. It is not easy for the user to directly specify such complicated curved surface shape. Especially, for example, in a case where the site selecting method illustrated in FIG. 1 is not used, the user inputs a new definition of the curved surface as for the surface buried in the three-dimensional model 1 in the site which is a selection target (a boundary surface between the region of the site and other regions). To newly define a target curved surface is a troublesome work. In contrast, if the site selecting method illustrated in FIG. 1 is used, the user only has to input the closed curve 4 and the specification of the depth, thereby easily specifying the target site.

Moreover, in the site selecting method illustrated in FIG. 1, in a case where the user grasps the position of the site based on the stereoscopic positional relationship in the object, the closed curve 4 may be specified on the stereoscopic three-dimensional model 1, so that it is only needed that the position and shape of the closed curve 4 grasped by the user are specified as they are. Therefore, it is easy to correctly specify the closed curve 4.

Note that, information indicating the site specified by the processing unit 12 may be used in simulation using the three-dimensional model 1, for example. In a case where the information indicating the specified site is used in the simulation, the processing unit 12 outputs information indicating that the site has a characteristic different from that of other parts in the object. The characteristic of the site different from that of the other parts includes, for example, electrical conductivity and rigidity.

For example, in a case where the three-dimensional model 1 is the model of the heart and the processing unit 12 selects the heart infarction site, the processing unit 12 outputs information indicating that the selected site is the infarction site where the myocardium is infarcted. For example, the processing unit 12 transmits a list of elements indicating the infarction site to a computer (heart simulator) that performs a heart simulation. The heart simulator executes the heart simulation while setting physical property values (electrical conductivity and rigidity) of the infarction site to values different from those of other parts of the myocardium. Therefore, a correct heart simulation of a patient suffering from myocardial infarction becomes possible.

Second Embodiment

Next, a second embodiment is described. The second embodiment is a system capable of easily specifying a heart infarction site when performing a heart simulation using a three-dimensional model of the heart of a patient.

Figure 2:
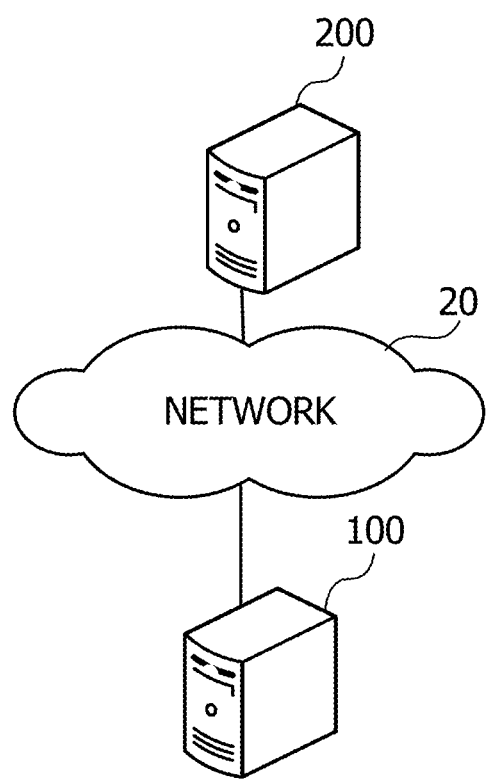
FIG. 2 is a view illustrating a system configuration example according to a second embodiment.

FIG. 2 is a view illustrating a system configuration example according to the second embodiment. For example, a site specifying device 100 is connected to a heart simulator 200 via a network 20. The site specifying device 100 sets an infarction site of a patient for a three-dimensional model of the heart of the patient in response to an operation by a user. The site specifying device 100 transmits information indicating the infarction site to the heart simulator 200.

The heart simulator 200 performs a simulation of a behavior of the heart using the three-dimensional model of the heart of the patient including the infarction site. For example, the heart simulator 200 sets a physical property value of the infarction site to a value different from that of other parts of the myocardium, and executes the heart simulation assuming a case where the infarction site is present.

Figure 3:
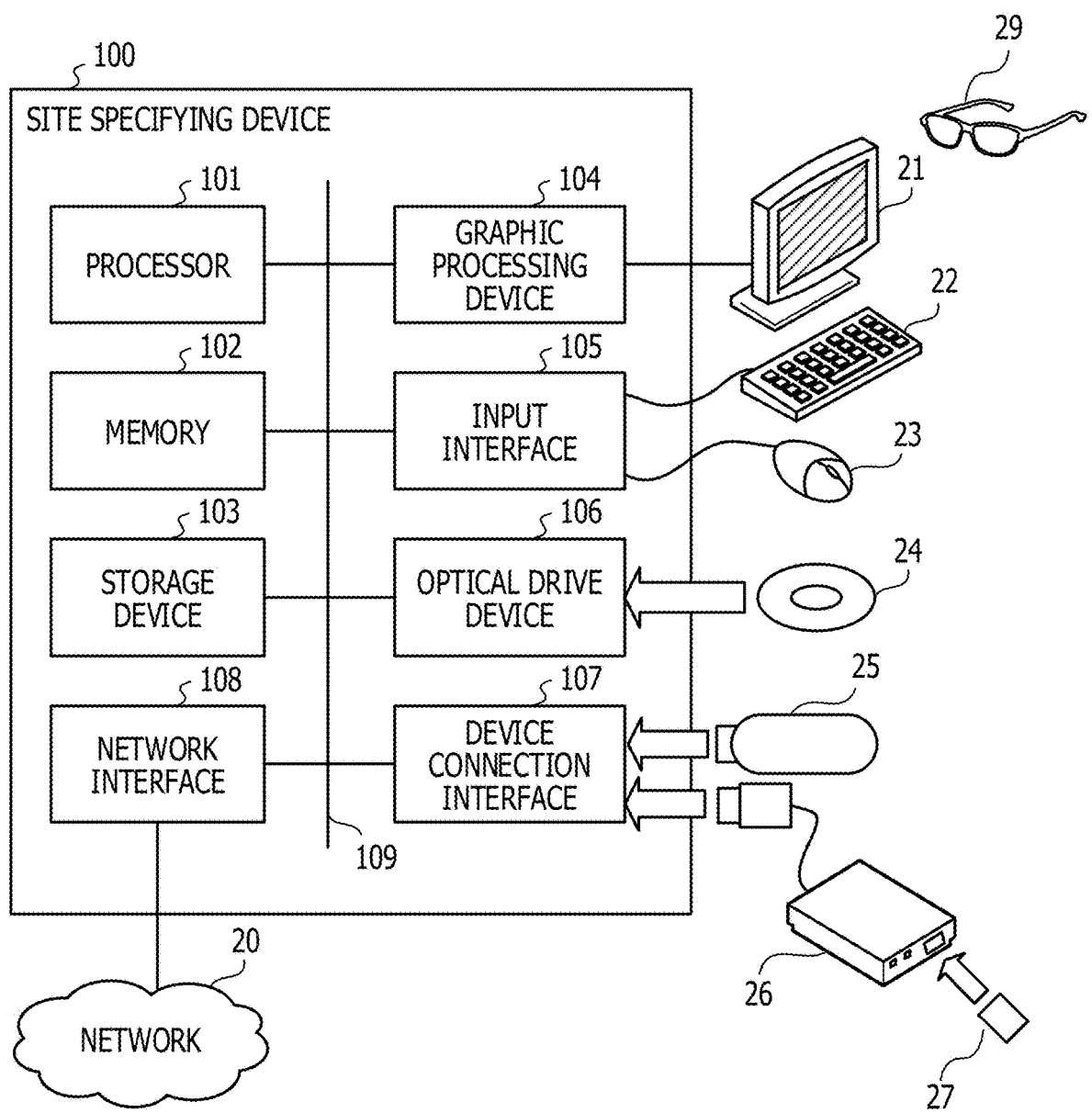
FIG. 3 is a view illustrating a configuration example of hardware of a site specifying device.

FIG. 3 is a view illustrating a configuration example of hardware of the site specifying device. An entire site specifying device 100 is controlled by a processor 101. A memory 102 and a plurality of peripheral devices are connected to the processor 101 via a bus 109. The processor 101 may also be a multiprocessor. The processor 101 is, for example, a central processing unit (CPU), a micro processing unit (MPU), or a digital signal processor (DSP). At least a part of functions realized by execution of a program by the processor 101 may be realized by an electronic circuit such as an application specific integrated circuit (ASIC) and a programmable logic device (PLD).

The memory 102 is used as a main storage device of the site specifying device 100. In the memory 102, at least a part of an operating system (OS) program and an application program to be executed by the processor 101 is temporarily stored. Furthermore, in the memory 102, various data used in processing by the processor 101 are stored. As the memory 102, for example, a volatile semiconductor storage device such as a random access memory (RAM) is used.

The peripheral devices connected to the bus 109 include a storage device 103, a graphic processing device 104, an input interface 105, an optical drive device 106, a device connection interface 107, and a network interface 108.

The storage device 103 writes and reads data electrically or magnetically in and from a built-in recording medium. The storage device 103 is used as an auxiliary storage device of a computer. The storage device 103 stores the OS program, the application program, and various data. Note that, as the storage device 103, for example, a hard disk drive (HDD) or a solid state drive (SSD) may be used.

To the graphic processing device 104, a monitor 21 is connected. The graphic processing device 104 displays an image on a screen of the monitor 21 according to an instruction from the processor 101. Examples of the monitor 21 include a display device using an organic electro luminescence (EL) and a liquid crystal display device.

The monitor 21 is, for example, a monitor capable of performing three-dimensional (3D) display. The image displayed on the monitor 21 may be stereoscopically viewed using 3D glasses 29. The monitor 21 is, for example, a passive circularly polarized 3D display. In this case, the 3D glasses 29 are provided with circularly polarized filters having different directional axes on right and left glasses.

To the input interface 105, a keyboard 22 and a mouse 23 are connected. The input interface 105 transmits signals transmitted from the keyboard 22 and the mouse 23 to the processor 101. The mouse 23 includes a mouse wheel between right and left buttons, for example. Note that, the mouse 23 is an example of a pointing device; other pointing devices may also be used. The other pointing devices include a touch panel, a tablet, a touch pad, a track ball and the like.

The optical drive device 106 reads data recorded on an optical disc 24 by using laser light or the like. The optical disc 24 is a portable recording medium on which the data is recorded so as to be readable by reflection of light. Examples of the optical disc 24 include a digital versatile disc (DVD), a DVD-RAM, a compact disc read only memory (CD-ROM), a CD-recordable (R)/rewritable (RW) and the like.

The device connection interface 107 is a communication interface for connecting the peripheral devices to the site specifying device 100. For example, to the device connection interface 107, a memory device 25 and a memory reader/writer 26 may be connected. The memory device 25 is a recording medium equipped with a communication function with the device connection interface 107. The memory reader/writer 26 is a device which writes data in the memory card 27 or reads data from the memory card 27. The memory card 27 is a card type recording medium.

The network interface 108 is connected to a network 20. The network interface 108 exchanges data with another computer or communication device via the network 20.

The site specifying device 100 may realize a processing function according to the second embodiment with a hardware configuration as described above. The heart simulator 200 may also be realized by the hardware similar to that of the site specifying device 100 illustrated in FIG. 3. Furthermore, the site specifying device 10 described in the first embodiment may also be realized by the hardware similar to that of the site specifying device 100 illustrated in FIG. 3.

The site specifying device 100 realizes the processing function of the second embodiment by executing, for example, a program recorded on a computer-readable recording medium. The program in which a processing content to be executed by the site specifying device 100 is described may be recorded on various recording media. For example, the program to be executed by the site specifying device 100 may be stored in the storage device 103. The processor 101 loads at least a part of the program in the storage device 103 on the memory 102 and executes the program. It is also possible to record the program to be executed by the site specifying device 100 on the portable recording medium such as the optical disc 24, the memory device 25, and the memory card 27. The program stored in the portable recording medium may be executed after being installed on the storage device 103, for example, by control of the processor 101. The processor 101 may also read the program directly from the portable recording medium and execute.

Next, difficulty in specifying the infarction site in the three-dimensional model is described.

For example, assume that the site specifying device 100 specifies the heart infarction site in the three-dimensional model based on a specification input of information of the specific number of points indicating the infarction site with respect to a plane obtained by two-dimensionally mapping/developing each of the ventricular endocardium and ventricular epicardium of the three-dimensional model of the heart. In this case, the site specifying device 100 converts once three-dimensional myocardial information on the two-dimensional plane. Thereafter, the user specifies a plurality of points on the plan view. The site specifying device 100 receives an input of the points on the plan view from the user and specifies a myocardial infarction region by converting the information of the specified points into the three-dimensional information again. For example, the site specifying device 100 specifies the myocardial infarction site by connecting the plurality of points specified on the plane with a closed curve and extending the same in a depth direction of the myocardium. In this case, the user only has to specify the plurality of points, and the site specifying device 100 automatically surrounds the plurality of points by the closed curve.

In a case where the user specifies the infarction site on such two-dimensional plane, the user only has to specify the plurality of points on the plan view as a manual operation. In contrast, in the specification of the infarction site using the plane, since the region is specified after the information which is originally three-dimensional is projected as the two-dimensional information, so that there are the following problems.

[Problem 1]

When specifying the infarction site on the two-dimensional plane, a heart structure which is originally three-dimensional is projected as plane information, and then the region is specified on the plan view. However, the heart of the patient visually recognized by the doctor is not a plane, but a stereoscopic image. Therefore, the position of the infarction site recognized by the doctor on the two-dimensional plane is not correctly understood, so that there is a case where the region of the infarction site specified by the doctor is different from the region recognized by the doctor.

This problem is described using a world map as an example. Although a globe is three-dimensional information, it is considered that a region is specified in a drawing in which a closed region on the globe is converted on a plan view. A typical plan view is the Mercator projection. The Mercator projection is a conformal projection, and a certain angle (for example, an angle between a straight line connecting two points and a meridian) appearing in the drawing is the same as the angle on a surface of a solid. The fact that the angles are the same means that a shape is correct within a sufficiently narrow range. On the other hand, an area is sacrificed in the Mercator projection. In other words, for example, in the Mercator projection, discrepancy in information of the area becomes larger in a higher latitude region.

Not only in the Mercator projection but also in the plan view obtained by projecting the solid, missing information differs depending on a physical amount which is saved in the plan view. The Mercator projection described above is created for the purpose of securing a sea route by making a conformal channel correct, but the information on distance and area is sacrificed instead. In this manner, when curved surface information which is originally stereoscopic is converted into the plan view, some information becomes incorrect.

In a case where the heart simulation is performed, both of an area of the infarction site and a shape of the infarction site are important. A stereoscopic view may correctly represent both the area and the shape of the infarction site. Therefore, if the infarction site may be directly specified in the stereoscopic view, the region of the infarction site having the correct area and shape may be specified, so that the correct heart simulation may be performed.

[Problem 2]

In a case where the doctor specifies the infarction site, it is ideal that the infarction site may be directly and intuitively specified for a realistic three-dimensional model. However, specifying the infarction site only by selecting the point on the heart is hard to be considered to be intuitive. It may be considered to be intuitive for the doctor to be able to move his/her hand to specify the infarction site along with the movement of the hand as in a case of specifying a site to be resected during surgery. The specification of the point on the plane is significantly different from such intuitive specification.

[Problem 3]

It is difficult to specify a depth of the myocardial infarction site from the surface of the heart when specifying the infarction site by specifying the point on the plane. The region where myocardial infarction occurs is a part of the heart. Therefore, a superficial region infarcted on the heart surface is finite and the depth is also finite. Then, the depth at which infarction occurs varies depending on a location of the infarction site. In this manner, the depth of the infarction site varies depending on the location, but it is not possible to appropriately specify a difference in depth only by specifying the point on the plane.

Issues are to solve the problems 1, 2, and 3 described above. The issues for solving the three problems are summarized as follows.

[Issue 1] To use expressions that the doctor may recognize with his/her own eyes including a depth of cardiac data.

[Issue 2]

The doctor may easily specify the myocardial infarction site with his/her own hands by an intuitive operation just like when using a scalpel.

[Issue 3]

To display information on the depth of the infarction site selected along the surface of the heart as visual information in an easily understandable manner.

In order to solve such issues, the site specifying device 100 according to the second embodiment stereoscopically displays the three-dimensional model of the heart by the monitor 21 for 3D display such that the infarction site at an arbitrary depth from the surface of the three-dimensional model may be specified based on an mouse operation by the user. The site specifying device 100 stereoscopically displays the three-dimensional model of the heart, so that the depth information of the object may be emphasized. Therefore, the user who is the doctor may easily specify an actual position of the infarction site on the heart on the three-dimensional model. Furthermore, when the site specifying device 100 receives the specification of the infarction site by specification of the region and depth by a general mouse operation, the user may specify the region intuitively with operational feeling similar to that of the scalpel operation.

Note that, by using a pointing device having a shape resembling the scalpel used in the surgery in place of the mouse operation, an input environment more resembling the scalpel operation may be obtained. For example, a pen for tablet may have a scalpel shape. Furthermore, a stylus for inputting to the touch panel may have a scalpel shape. Similarly, a shape of a mouse cursor displayed on the screen may have a scalpel shape.

Hereinafter, a function of the site specifying device 100 is described in detail.

Figure 4:
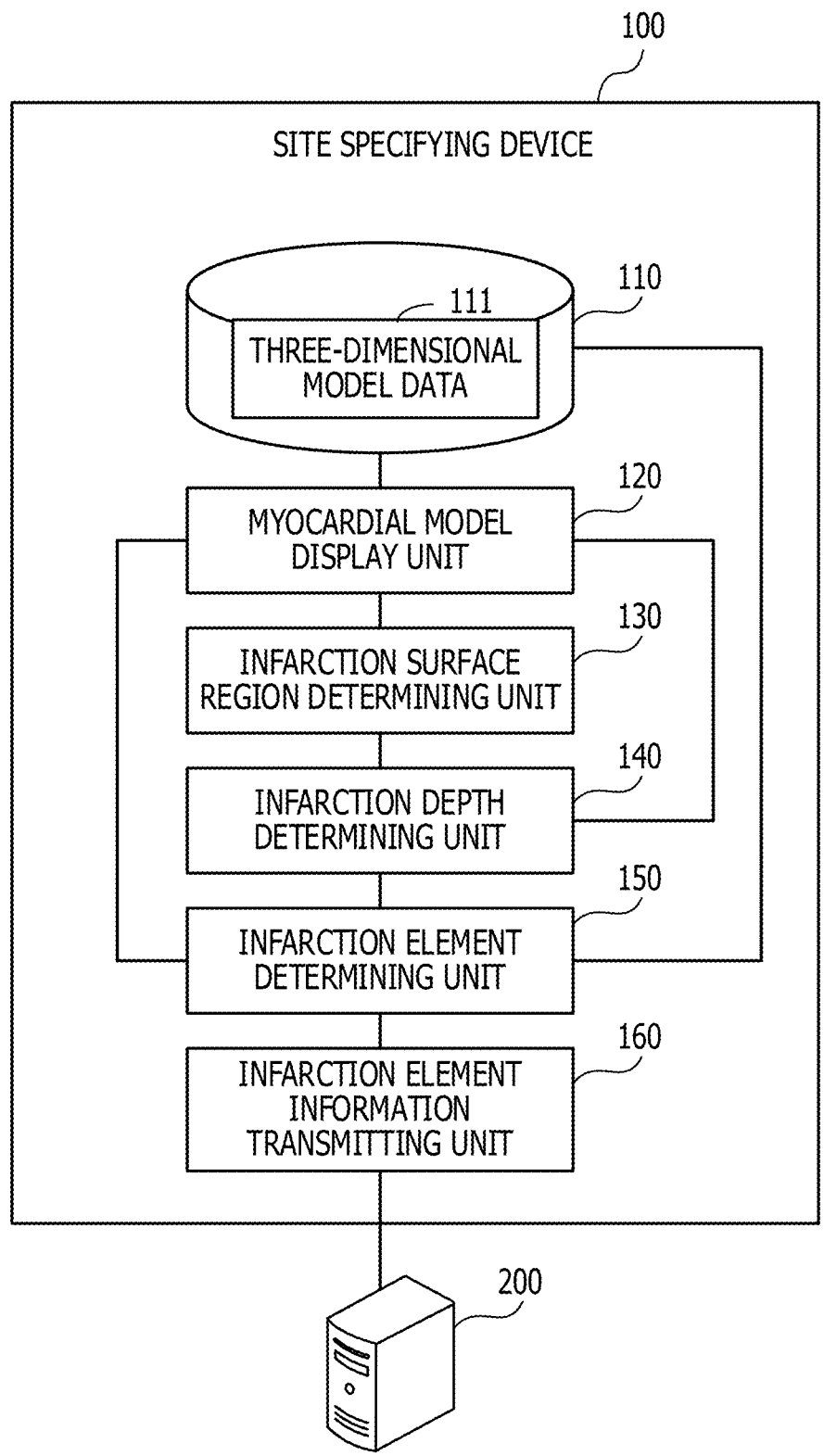
FIG. 4 is a block diagram illustrating functions of the site specifying device.

FIG. 4 is a block diagram illustrating functions of the site specifying device. The site specifying device 100 includes a storage unit 110, a myocardial model display unit 120, an infarction surface region determining unit 130, an infarction depth determining unit 140, an infarction element determining unit 150, and an infarction element information transmitting unit 160.

The storage unit 110 stores three-dimensional model data 111 representing the three-dimensional model of the heart. The three-dimensional model data 111 is, for example, data of positions and shapes of a great number of tetrahedral elements.

The myocardial model display unit 120 displays a stereoscopic image of the heart based on a three-dimensional model representing a myocardial shape of the heart. Furthermore, when receiving the infarction element information indicating the elements included in the infarction site, the myocardial model display unit 120 displays the three-dimensional model while distinguishing the infarction site from other sites on the stereoscopic image of the heart. For example, the myocardial model display unit 120 may display the three-dimensional model from which the infarction site is excluded.

The infarction surface region determining unit 130 determines a range (infarction surface region) exposed on the myocardial surface at the infarction site of the heart. For example, the infarction surface region determining unit 130 determines a closed region surrounded by a pointer operation by the user on the display screen of the three-dimensional model of the heart as the infarction surface region.

The infarction depth determining unit 140 determines the depth of the infarction site from the myocardial surface. For example, the infarction depth determining unit 140 displays a depth gauge to specify a thickness of the infarction site based on a thickness of the myocardium, and determines the depth of the infarction site according to the thickness specified by the user by using the depth gauge.

The infarction element determining unit 150 sets a region at the determined depth in the determined infarction range as the infarction region, and extracts the element included in the infarction site from the three-dimensional model as an infarction element. For example, the infarction element determining unit 150 sets an element at least a part of which is included in the infarction region out of the elements forming the three-dimensional model as the infarction element. The infarction element determining unit 150 transmits, for example, infarction element information indicating the infarction element to the myocardial model display unit 120 and the infarction element information transmitting unit 160.

The infarction element information transmitting unit 160 transmits the infarction element information to the heart simulator 200. The heart simulator 200 performs the heart simulation while changing the physical property value of a physical property amount such as the electric conductivity and rigidity based on the infarction element information.

Note that, lines connecting the respective elements illustrated in FIG. 4 indicate a part of a communication path, and a communication path other than the illustrated communication path may also be set. Furthermore, the function of each element illustrated in FIG. 4 may be realized, for example, by allowing the computer to execute a program module corresponding to the element.

Next, the three-dimensional model data 111 stored in the storage unit 110 is specifically described.

FIG. 5 is a view illustrating an example of the three-dimensional model data of the heart. The three-dimensional model data 111 includes, for example, a node information table 111a and an element information table 111b. In the node information table 111a, a node number and coordinates indicating a position of a node are set for every node. The coordinates of each node in the node information table 111a indicate the position of the node in a state before the simulation is executed. In the element information table 111b, an element number and node numbers of the nodes at vertices of the tetrahedral element are set for every element.

Based on the three-dimensional model data 111 illustrated in FIG. 5, the three-dimensional model representing the myocardium of the heart may be generated. For example, the myocardial model display unit 120 displays the three-dimensional model data generated based on the three-dimensional model data 111 in an infarction site specification screen.

Figure 6:
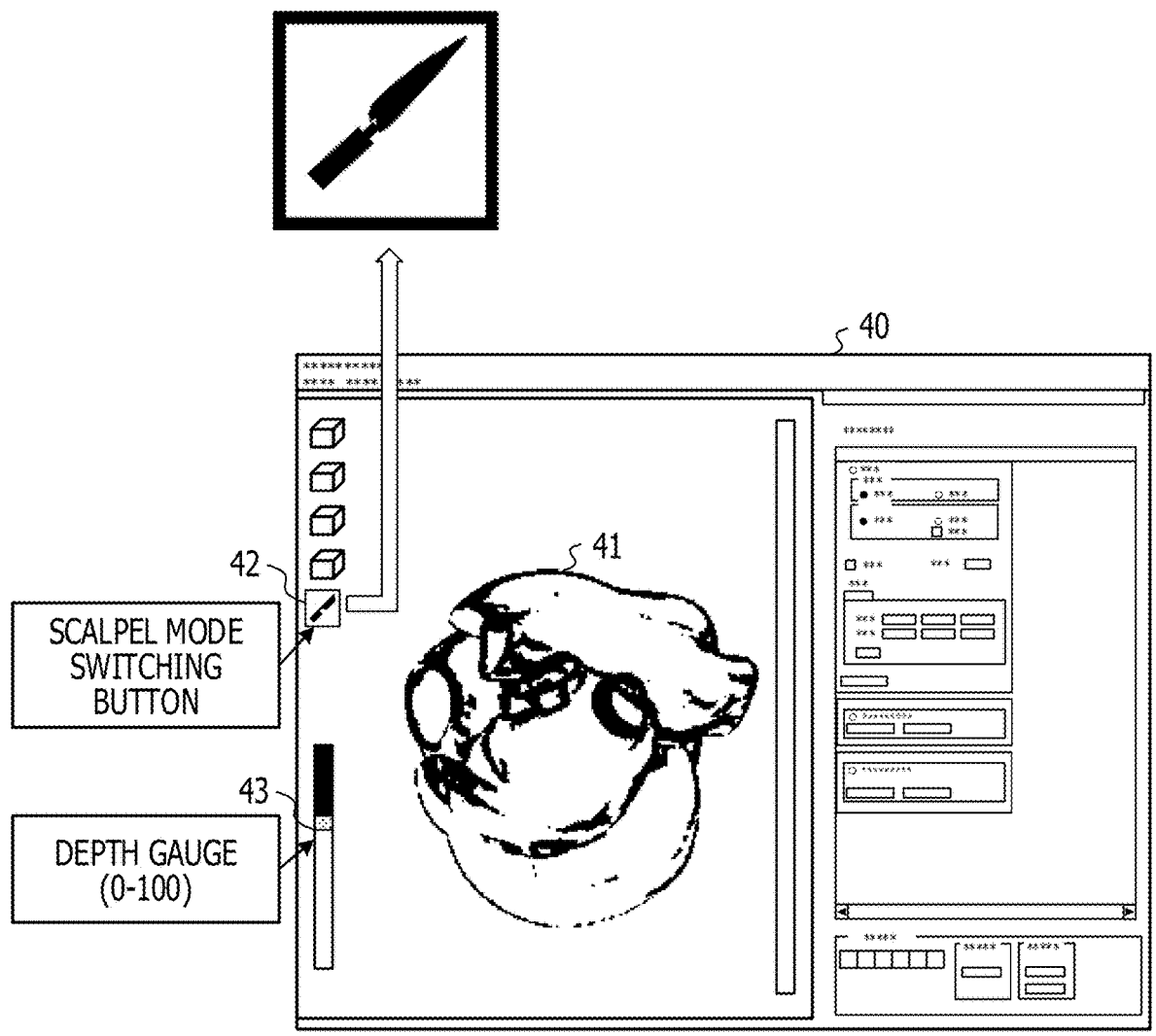
FIG. 6 is a view illustrating an example of an infarction site specification screen.

FIG. 6 is a view illustrating an example of the infarction site specification screen. In an infarction site specification screen 40, a three-dimensional model 41 of the myocardium is displayed as a stereoscopic image. In the infarction site specification screen 40, a scalpel mode switching button 42 is also displayed.

The scalpel mode switching button 42 is a button for changing an operation mode by the mouse pointer to a mode (scalpel mode) for specifying the infarction site. On the scalpel mode switching button 42, for example, an icon in a shape of the scalpel for surgery is displayed.

When the user selects the scalpel mode switching button 42, the myocardial model display unit 120 changes the operation mode by the mouse pointer to the scalpel mode. When the user selects the scalpel mode switching button 42 again during the scalpel mode, the myocardial model display unit 120 cancels the scalpel mode. In this manner, the user may switch on and off the scalpel mode by selection by the mouse operation of the scalpel mode switching button 42 indicated by the scalpel-shaped icon on a graphical user interface (GUI) screen.

When the scalpel mode is turned on, the myocardial model display unit 120 displays a depth gauge 43 for determining the depth of the infarction site in the infarction site specification screen 40. In the depth gauge 43, for example, a depth amount when the thickness of the myocardium is set to "100" and the depth of the infarction site from the myocardium epicardium is specified in a range of "0-100" is displayed as a length of the bar. In other words, for example, the depth gauge 43 indicates a percentage of the infarction site with respect to the thickness of the myocardium.

Note that, the depth of the infarction site corresponds to a depth of incision by the scalpel in a case where it is assumed that the infarction site is resected with the scalpel. In other words, for example, the user who is the doctor may intuitively specify the depth of the infarction site while imagining resecting the infarction site with the scalpel.

When the scalpel mode is turned on, the myocardial model display unit 120 fixes the position and orientation of the three-dimensional model 41 of the heart in a three-dimensional virtual space, and enables a specifying operation of the infarction site with respect to the three-dimensional model 41.

A state in which the position and orientation of the three-dimensional model 41 are fixed in this manner is hereinafter referred to as a state in which the user grasps. Note that, the user may cancel the state of grasping the three-dimensional model 41 of the heart by, for example, pressing a right button of the mouse 23. The user performs the specifying operation of the infarction site in a state of grasping the three-dimensional model 41.

Figure 7:
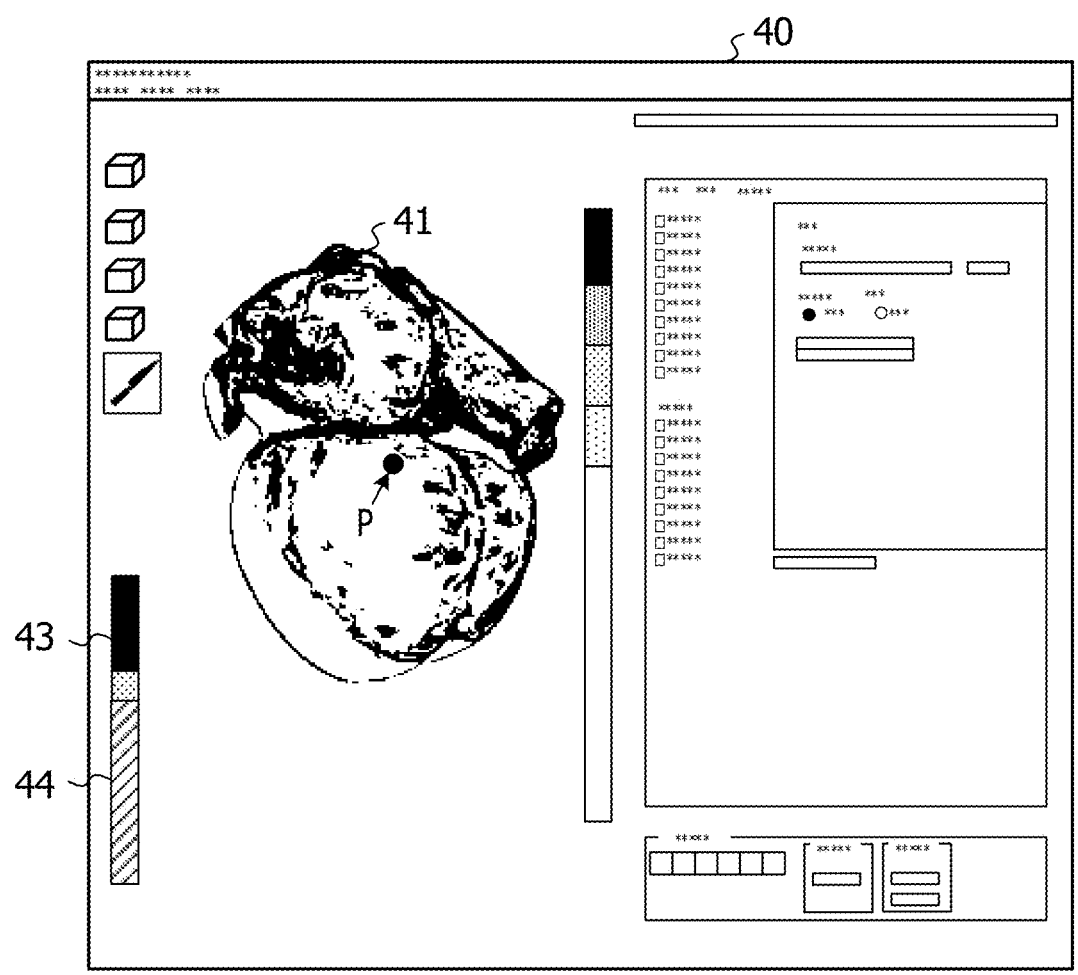
FIG. 7 is a view illustrating an example of specifying a depth of an infarction site.

FIG. 7 is a view illustrating an example of specifying the depth of the infarction site. For example, after turning on the scalpel mode, the user operates the mouse 23 to select one point of the displayed three-dimensional model 41. The myocardial model display unit 120 displays a selected point P, for example, as a small colored point in the infarction site specification screen 40. Furthermore, since the scalpel mode is turned on, the myocardial model display unit 120 displays the depth gauge 43 on the infarction site specification screen 40.

The depth of the infarction site specified by the user is indicated by a bar 44 on the depth gauge 43. The depth of the infarction site is determined by the infarction depth determining unit 140. For example, when the user rotates the mouse wheel of the mouse 23, the infarction depth determining unit 140 changes the depth of the infarction site according to a rotational direction and a rotational angle of the mouse wheel. Specifically, for example, when the user rotates the mouse wheel from a near side to a far side, the infarction depth determining unit 140 extends the bar 44 on the depth gauge 43 according to a rotational amount. Furthermore, when the user rotates the mouse wheel from the far side to the near side, the infarction depth determining unit 140 shortens the bar 44 on the depth gauge 43 according to the rotational amount. Therefore, the length of the bar 44 displayed on the depth gauge 43 indicates the depth of the infarction site specified by the user.

As illustrated in FIG. 7, the depth of the infarction site is indicated by the bar 44 as a ratio to the thickness of the myocardium at the specified point P. The depth of the infarction site in millimeters is determined based on the thickness of the myocardium. Therefore, when the point P is selected, the infarction depth determining unit 140 calculates the thickness of the myocardium at the point P.

Figure 8:
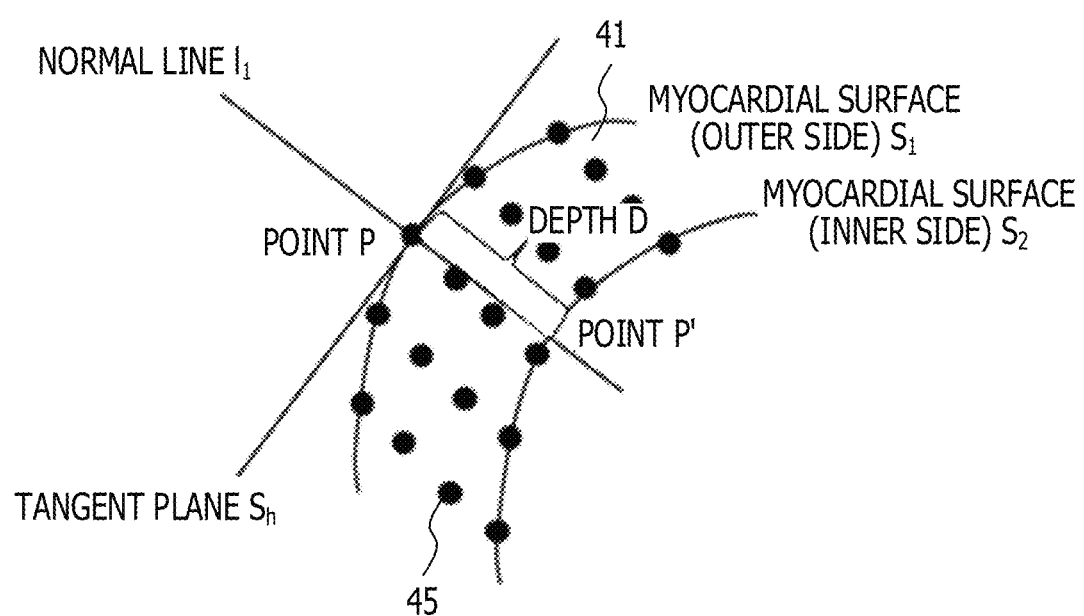
FIG. 8 is a view illustrating a cross-section of the myocardium.

FIG. 8 is a view illustrating a cross-section of the myocardium. The shape of the myocardium represented by the three-dimensional model 41 is defined by a plurality of nodes 45. In the three-dimensional model 41, a region interposed between an outer side myocardial surface $S_1$ and an inner side myocardial surface $S_2$ is the region where the myocardium is present. A thickness D of the myocardium at the point P is a distance between intersections between a normal line $l_1$ passing through the point P and the outer side myocardial surface $S_1$ and the inner side myocardial surface $S_2$. The normal line $l_1$ passing through the point P is a straight line perpendicular to a tangent plane S of the outer side myocardial surface $S_1$ at the point P.

Figure 9:
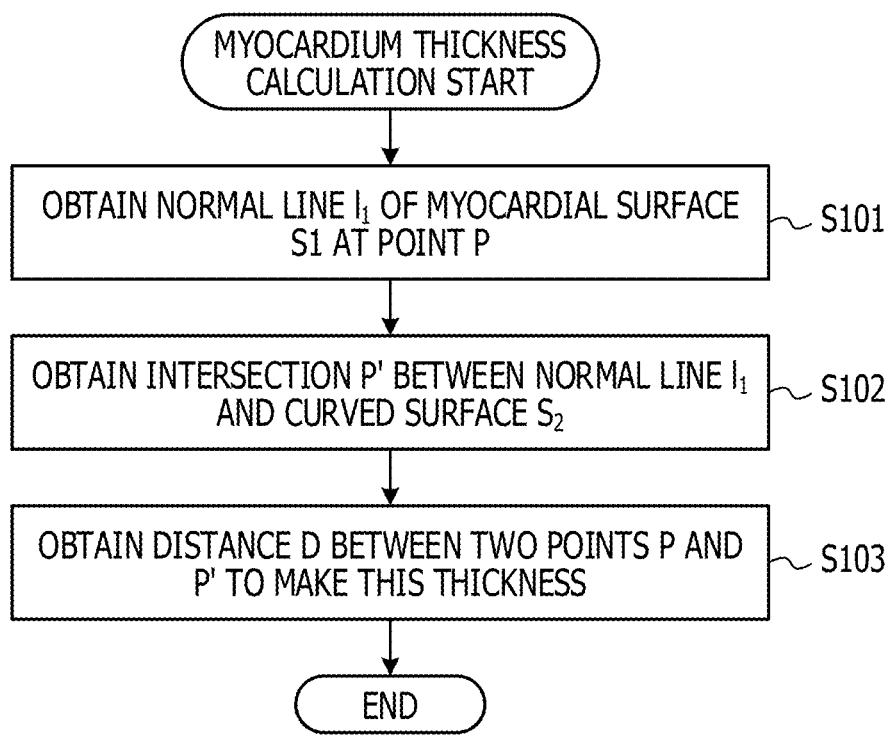
FIG. 9 is a flowchart illustrating an example of a procedure when calculating a thickness of the myocardium.

FIG. 9 is a flowchart illustrating an example of a procedure when calculating the thickness of the myocardium. Hereinafter, a process illustrated in FIG. 9 is described along step numbers.

[Step S101] The infarction depth determining unit 140 obtains a normal vector of the outer side myocardial surface $S_1$ at the point P and the normal line $l_1$. For example, the infarction depth determining unit 140 calculates the tangent plane $S_n$ of the outer side myocardial surface $S_1$ at the point P. Next, the infarction depth determining unit 140 calculates a normal vector perpendicular to the tangent plane $S_n$. Then, the infarction depth determining unit 140 calculates a straight line passing through the point P and parallel to the calculated normal vector, and sets this as the normal line $l_1$.

[Step S102] The infarction depth determining unit 140 obtains an intersection P' between the normal line $l_1$ and the inner side myocardial surface $S_2$.

[Step S103] The infarction depth determining unit 140 calculates a distance between the two points P and P', and sets the calculated distance as the thickness D of the myocardium.

The infarction depth determining unit 140 transmits the calculated thickness D of the myocardium to the myocardial model display unit 120. Then, the myocardial model display unit 120 displays the thickness D of the myocardium at the selected point P next to the depth gauge 43.

Figure 10:
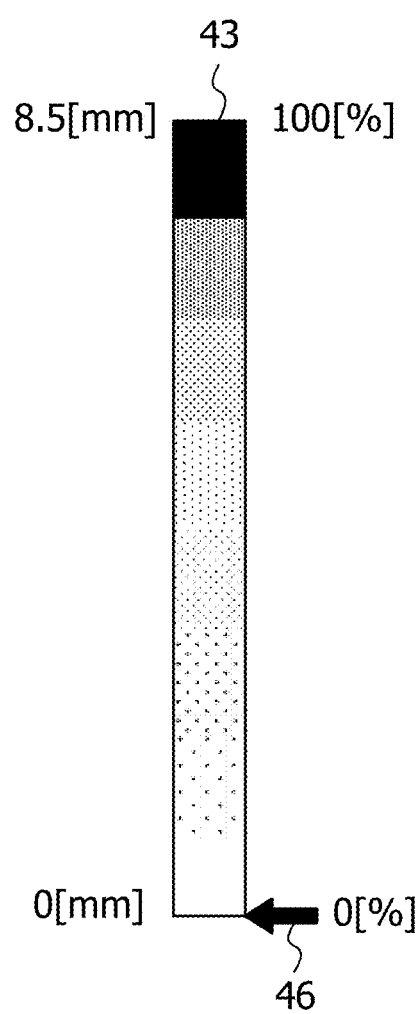
FIG. 10 is a view illustrating an example of a depth gauge.

FIG. 10 is a view illustrating an example of the depth gauge. For example, the myocardial model display unit 120 displays an actual thickness (in millimeters in the example of FIG. 10) on a left side of the depth gauge 43 and displays a percentage scale in which the thickness at that point is "100" on a right side of the depth gauge 43 so as to display the thickness D of the myocardium in an easily understandable manner. A scale minimum value of the percentage is 0.

There is an arrow 46 indicating an infarction depth set value next to the depth gauge 43. When the point P is selected, the infarction depth is not specified. In the example of FIG. 10, an initial value of the infarction depth is the minimum value of "0", and the arrow 46 of the infarction depth set value indicates a position of "0%".

With reference to the depth gauge 43 as illustrated in FIG. 10, the user sets the infarction depth according to the thickness of the infarction site of the patient. For example, the user presses a center button (wheel in a case of a wheel type) of the mouse to set the infarction depth. When detecting that the center button is pressed, the infarction depth determining unit 140 switches a processing mode to a depth determining mode. Note that, the infarction depth determining unit 140 may switch to the depth determining mode when a separately prepared icon is selected.

After switching to the depth determining mode, the user adjusts the depth by rotating the mouse wheel back and forth. For example, when the user moves the mouse wheel from the near side to the far side, the infarction depth determining unit 140 increases the infarction depth and extends the bar 44 on the depth gauge 43 upward. Furthermore, when the user moves the mouse wheel from the far side to the near side, the infarction depth determining unit 140 decreases the infarction depth and shortens the bar 44 on the depth gauge 43 downward.

Note that, the infarction depth determining unit 140 may also change a color of the bar 44 according to the length of the bar 44. For example, the infarction depth determining unit 140 darkens the color as the bar 44 becomes longer.

In this manner, the infarction depth determining unit 140 changes the length and color of the bar 44 according to the infarction depth set value to display, so that the user may easily recognize the infarction depth currently set.

Figure 11:
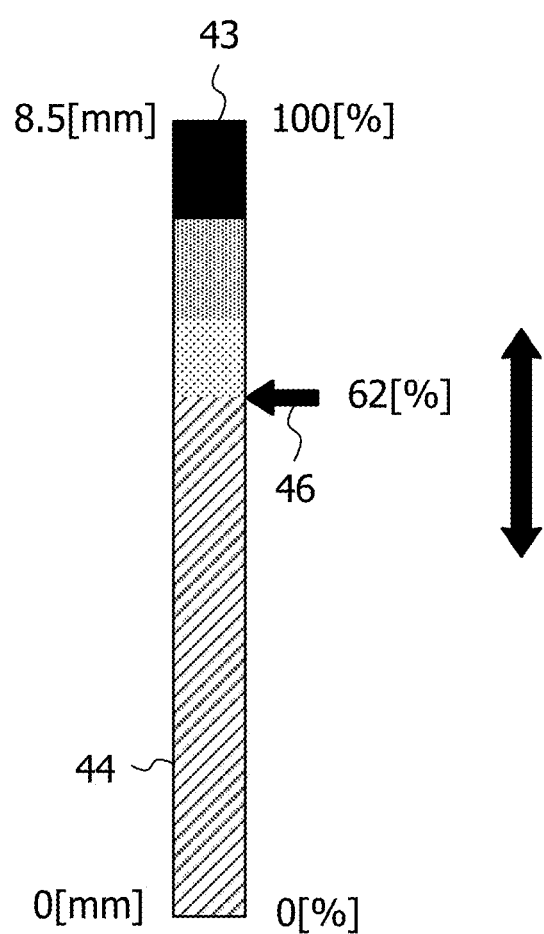
FIG. 11 is a view illustrating a setting example of an infarction depth using the depth gauge.

FIG. 11 is a view illustrating a setting example of the infarction depth using the depth gauge. When the user rotates the mouse wheel, the bar 44 on the depth gauge 43 extends and shortens. The arrow 46 indicating the current infarction depth set value and a numerical value indicating the infarction depth in percentage (percentage in the thickness of the myocardium) are displayed next to an uppermost portion of the bar 44.

In an initial state, the infarction depth determining unit 140 sets such that the length of the bar 44 becomes from "0%" to the maximum value "100%" when the mouse wheel makes one rotation (360 degrees), for example. The infarction depth determining unit 140 may also set percentage of the depth gauge 43 filled per one rotation of the mouse wheel according to a user input. For example, the infarction depth determining unit 140 sets the rotational angle of one rotation (360 degrees) of the mouse wheel as a unit rotational angle, and changes an amount of increase or decrease of the infarction depth when the mouse wheel is rotated by the unit rotational angle according to the input from the user.

If the user is requested to input a numerical value of the amount of increase or decrease in infarction depth per unit rotational angle, operability is poor, so that the infarction depth determining unit 140 defines a shortcut key for changing the amount of increase or decrease of the infarction depth. For example, the infarction depth determining unit 140 defines two keys on the keyboard as the shortcut keys. For example, the infarction depth determining unit 140 assigns the shortcut keys for changing the amount of increase or decrease of the infarction depth per unit rotational angle to F8 and F9 keys on the keyboard.

When one of the shortcut keys (for example, F8) is pressed, the infarction depth determining unit 140 doubles the amount of increase or decrease of the infarction depth per unit rotational angle. Furthermore, when the other shortcut key (for example, F9) is pressed, the infarction depth determining unit 140 reduces the amount of increase or decrease of the infarction depth per unit rotational angle to half.

Therefore, the user may adjust an increasing/decreasing width of the depth bar on the depth gauge 43 while pressing these shortcut keys without taking his/her eyes off the screen. Note that, the infarction depth determining unit 140 may also prepare an angle reset button for resetting the unit rotational angle and assign the same to the shortcut key. The infarction depth determining unit 140 assigns, for example, a F10 key to an angle reset key.

In this manner, the user may operate while touching the mouse with one hand and touching the keyboard with the other hand with his/her eyes kept looking at the screen. For example, in a state in which the bar 44 displayed on the depth gauge 43 becomes from 0% to 100% in one rotation of the mouse wheel (360 degrees), when the user presses the F8 key once, the infarction depth determining unit 140 changes the amount of increase or decrease of the bar 44 according to the rotational angle of the mouse wheel such that the bar 44 changes from 0% to 100% with half-turn of the mouse wheel (180 degrees). When the user presses the F8 key once again, the infarction depth determining unit 140 changes the amount of increase or decrease of the bar 44 according to the rotational angle of the mouse wheel such that the bar 44 becomes from 0% to 100% with quarter-turn (90 degrees). When the amount of increase or decrease of the infarction depth per unit rotational angle is increased in this manner, a significant change in the infarction depth may be made quickly.

Furthermore, in a state in which the bar 44 displayed on the depth gauge 43 changes from 0% to 100% with one rotation of the mouse wheel (360 degrees), when the user presses the F9 key once, the bar 44 changes from 0% to 50% with one rotation of the mouse wheel (360 degrees). When the user presses the F9 key once again, the bar 44 changes from 0% to 25% with one rotation of the mouse wheel (360 degrees). When the amount of increase or decrease of the infarction depth per unit rotational angle is reduced in this manner, fine adjustment of the infarction depth becomes easier.

Note that, the minimum rotational angle is sometimes large depending on the mouse wheel, and there is a case where it is difficult to adjust the amount of increase or decrease of the infarction depth per unit rotational angle to an appropriate value even if this may be adjusted. Therefore, in a case where the user moves the mouse 23 back and forth while left-clicking the arrow 46 displayed next to the value of the depth gauge 43, the infarction depth determining unit 140 finely adjusts the infarction depth according to an amount of mouse movement. Finer operations may be performed by the movement back and forth of the mouse 23 than by the rotation of the mouse, and the infarction depth may be adjusted by the movement of the mouse 23, so that the fine adjustment may be performed.

When the user presses the center button of the mouse once again, the infarction depth determining unit 140 cancels the depth determining mode. The infarction depth determining unit 140 stores an infarction depth d when the depth determining mode is canceled in a main storage device. When the depth determining mode is canceled, the infarction depth determining unit 140 automatically moves, for example, the mouse cursor to the position of the point P.

When the user determines the depth in the scalpel mode, the button might be released (separated) from the state in which the point P is selected. In this case, when the user operates the mouse 23 to move the mouse cursor to the vicinity of the point P, the myocardial model display unit 120 changes the color of the point P when the mouse cursor overlaps the point P, for example. When the user presses a left click button of the mouse 23 in a state in which the mouse cursor overlaps the point P, the myocardial model display unit 120 selects the point P again.

When the user moves the mouse 23 while pressing the left button of the mouse 23 with the point P selected, the infarction surface region determining unit 130 determines a region in a range indicated by the movement of the mouse cursor as the infarction surface region. The myocardium in the range of the infarction depth specified by the point P in the infarction surface region is the infarction site.

Figure 12:
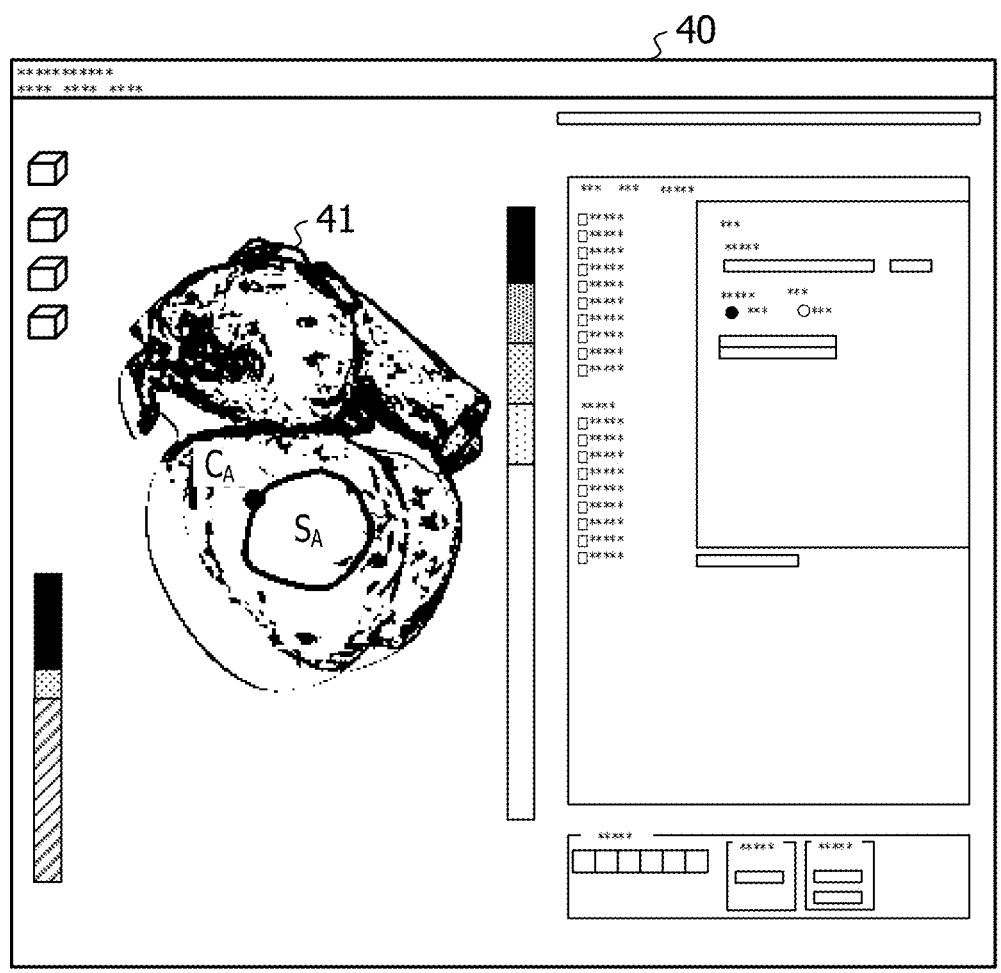
FIG. 12 is a view illustrating an example of determining an infarction surface region.

FIG. 12 is a view illustrating an example of determining the infarction surface region. For example, when the user moves the mouse cursor, the infarction surface region determining unit 130 draws a line along a track of the mouse cursor. For example, the user starts the mouse cursor at the point P (refer to FIG. 7), moves the mouse cursor so as to surround the range of the infarction site appearing on the myocardial surface, and further moves the mouse cursor to the point P. Then, the infarction surface region determining unit 130 generates a closed curve $C_A$ starting from and ending at the point P on the myocardial surface. The infarction surface region determining unit 130 sets a curved surface $S_A$ surrounded by the closed curve $C_A$ as the infarction surface region.

When the infarction depth and the infarction surface region are determined, the infarction element determining unit 150 determines the closed region indicating the infarction site. Hereinafter, a method of determining the closed region is described.

Figure 13:
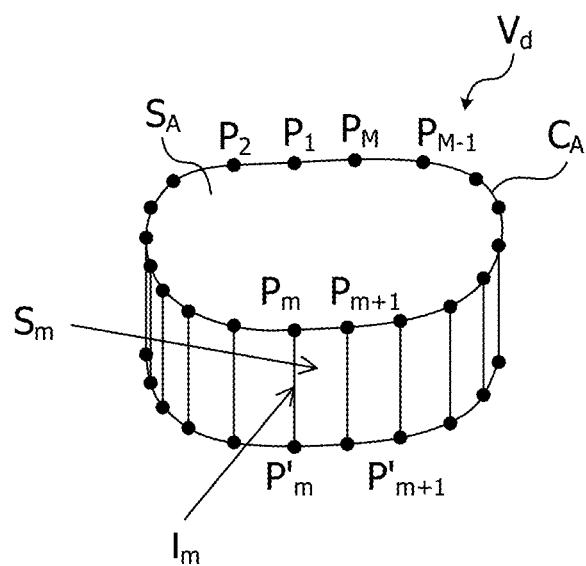
FIG. 13 is a view illustrating an example of a method of determining a closed region indicating the infarction site.

FIG. 13 is a view illustrating an example of a method of determining the closed region indicating the infarction site. The infarction element determining unit 150 obtains a length of the closed curve $C_A$ on the outer side myocardial surface, and selects points $P_m$ (m=1, 2, . . . , M) on the closed curve $C_A$ so as to divide the length into M (M is an integer not smaller than two). The infarction element determining unit 150 generates, for each point $P_m$, a normal line $l_m$ that passes through the point $P_m$ and is perpendicular to the myocardial surface. The infarction element determining unit 150 sets an intersection between the normal line $l_m$ and the inner side myocardial surface as $P'_m$. At that time, a curved surface $\{P_m, P'_m, P_{(m+1)}, P'_{(m+1)}\}$ may be regarded as a plane in a case where the number of division M is large. Therefore, the infarction element determining unit 150 generates M planes $S_m$ having points $P_m$, $P'_m$, $P_{(m+1)}$, and $P'_{(m+1)}$ as vertices by setting as m=1, 2, . . . , M. The infarction element determining unit 150 sets a set of M planes $S_m$ (m=1, 2, . . . , M) as a boundary surface $S_{Side}$ between the region of the infarction site and other regions in the myocardium.

Next, the infarction element determining unit 150 sets a region surrounded by the curved surface $S_A$ and the boundary surface $S_{Side}$, the region located at an infarction depth d from each point of the curved surface $S_A$ as a closed region $V_d$ representing the infarction site. Then, the infarction element determining unit 150 determines an element in the closed region $V_d$ as follows.

Figure 14:
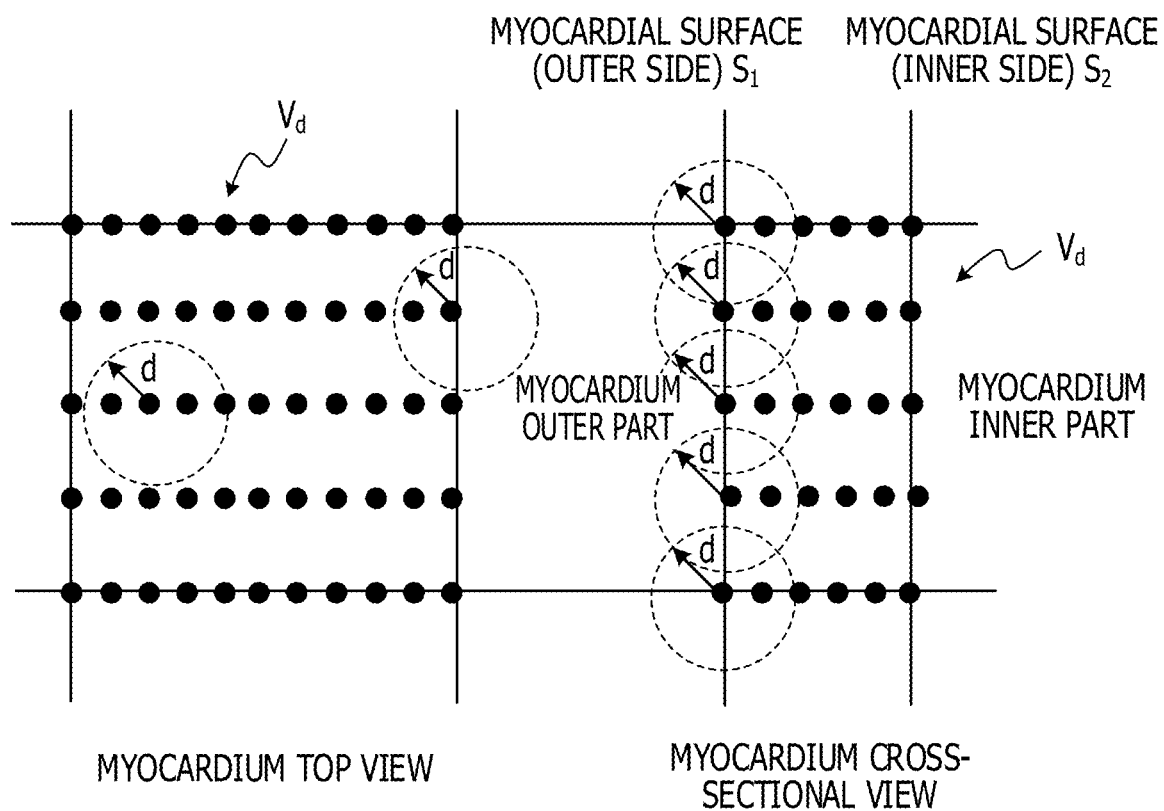
FIG. 14 is a view illustrating an example of determining an element in a closed region $V_d$.

FIG. 14 is a view illustrating an example of determining the element in the closed region $V_d$. FIG. 14 illustrates a top view of the myocardium at the position where the closed region $V_d$ is present, and a cross-sectional view of the myocardium at the position in which the closed region $V_d$ is present. In the cross-sectional view, the myocardial surface $S_1$ on the outer side of the heart is on the left side, and the myocardial surface $S_2$ on the inner side of the heart is on the right side. Note that, although FIG. 14 illustrates the closed region $V_d$ as a square surrounded by straight lines for simplicity, the closed region $V_d$ actually is a region surrounded by a curve.

The infarction element determining unit 150 assumes spheres having a radius d from all the nodes on the outer side myocardial surface $S_1$ in the closed region $V_d$. The infarction element determining unit 150 extracts the nodes included in the range of the sphere having the radius d from all the nodes on the myocardial surface $S_1$ and on the inner side of the boundary surface $S_{Side}$ of the closed region $V_d$ as the nodes in the closed region $V_d$. The infarction element determining unit 150 determines, out of the elements forming the three-dimensional model 41 of the heart, the element including the extracted node as one of the vertices, the element in the region in which myocardial infarction occurs (infarction element).

Figure 15:
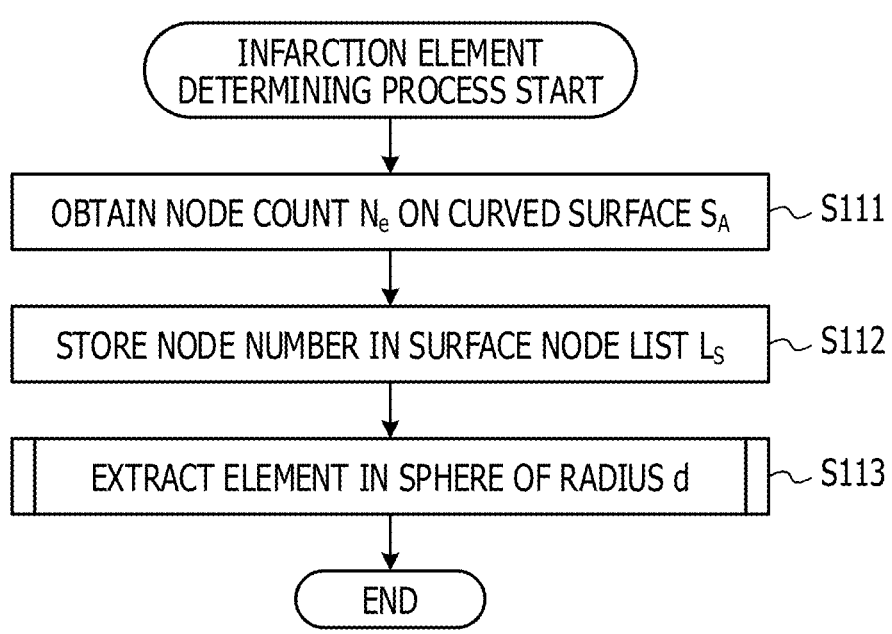
FIG. 15 is a flowchart illustrating an example of a procedure of an infarction element determining process.

FIG. 15 is a flowchart illustrating an example of a procedure of an infraction element determining process. Hereinafter, a process illustrated in FIG. 15 is described along step numbers.

[Step S111] The infarction element determining unit 150 obtains the number of nodes (node count) $N_e$ on the curved surface $S_A$ out of the nodes on the outer side myocardial surface $S_1$.

[Step S112] The infarction element determining unit 150 stores the node number of the node (surface node) on the curved surface $S_A$ in a surface node list $L_S$.

[Step S113] The infarction element determining unit 150 extracts the element in the sphere having the radius d from each of all the surface nodes stored in the node list. A set of the extracted elements represents the infarction site.

Figure 16:
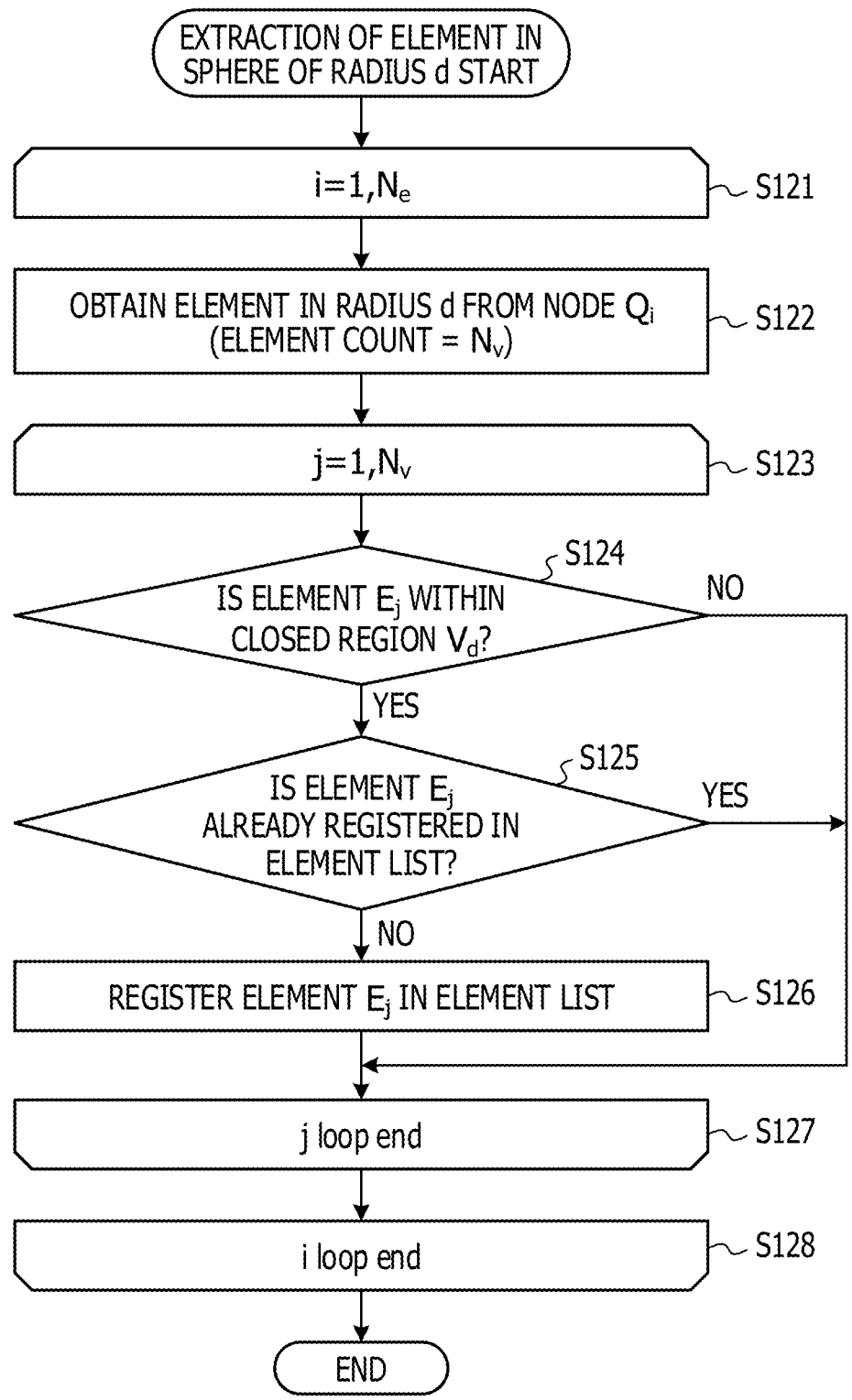
FIG. 16 is a flowchart illustrating a detailed procedure of a process of extracting an element in a sphere having a radius d.

FIG. 16 is a flowchart illustrating a detailed procedure of a process of extracting the element in the sphere having the radius d. Hereinafter, a process illustrated in FIG. 16 is described along step numbers.

[Step S121] The infarction element determining unit 150 repeats the processes at steps $S_{122}$ to $S_{127}$ as many times as the number of nodes $N_e$. For example, the infarction element determining unit 150 sets a variable i indicating the number of times of execution of a repeating process to an initial value "1". The infarction element determining unit 150 increments the value of the variable i by one every time the processes at steps S122 to S127 are performed once. Then, the infarction element determining unit 150 repeats the processes at steps S122 to S127 until the variable i exceeds the number of nodes $N_e$.

[Step S122] The infarction element determining unit 150 defines a sphere $S_1$ having the radius d centered on an i-th node Q on the curved surface $S_A$. Then, the infarction element determining unit 150 obtains all the elements present in a region $V_{di}$ inside the sphere $S_{di}$. For example, the infarction element determining unit 150 extracts the element including at least one node present in the sphere $S_{di}$. The infarction element determining unit 150 stores an element count obtained at that time in the memory 102 as $N_v$.

[Step S123] The infarction element determining unit 150 repeats the processes at steps S124 to S126 as many times as the element count $N_v$. For example, the infarction element determining unit 150 sets a variable j indicating the number of times of execution of the repeating process to an initial value 1. The infarction element determining unit 150 increments the value of the variable j by one every time the processes at steps S124 to S126 are performed once. Then, the infarction element determining unit 150 repeats the processes at steps S124 to S126 until the variable j exceeds the element count $N_v$.

[Step S124] The infarction element determining unit 150 determines whether a j-th element $E_j$ among the elements obtained at step S122 is present in the closed region $V_d$. For example, if at least one of the nodes of the element $E_j$ is present in the closed region $V_d$, the infarction element determining unit 150 determines that the element $E_j$ is in the closed region $V_d$. If this is in the closed region $V_d$, the infarction element determining unit 150 shifts the procedure to step S125. Furthermore, if this is not in the closed region $V_d$, the infarction element determining unit 150 shifts the procedure to step S127.

[Step S125] The infarction element determining unit 150 determines whether the j-th element $E_j$ is already registered in the element list. If this is already registered in the element list, the infarction element determining unit 150 shifts the procedure to step S127. If this is not yet registered in the element list, the infarction element determining unit 150 shifts the procedure to step S126.

[Step S126] The infarction element determining unit 150 registers the j-th element $E_j$ in the element list.

[Step S127] The infarction element determining unit 150 increments the value of the variable j by one, and in a case where the variable j exceeds the element count $N_v$, the procedure shifts to step S128.

[Step S128] The infarction element determining unit 150 increments the value of the variable i by one, and finishes a process of extracting the element in the sphere having the diameter d in a case where the variable i exceeds the node count $N_e$.

As a result of the process of extracting the element in the sphere having the radius d, a set of elements included in the infarction site is set in the element list. The element included in the infarction site is the element in the sphere having the radius d from any one of the surface nodes and includes at least one node in the closed region $V_d$.

FIG. 17 is a view illustrating an example of the element list. An element list 50 is provided with fields of the element number, the element type, and four node numbers. The element number of the element included in the infarction site is set in the element number field. In the element type field, the type of the corresponding element is set. For example, if the element type is a tetrahedron (tetra element), "tet" is set in the element type field. In the four node number fields, the node numbers of the nodes in the sphere having the radius d from any of the surface nodes and in the closed region $V_d$ out of the nodes of the corresponding elements are set.

In this manner, when a set of elements included in the infarction site is defined in the element list 50, a process different from that of other sites may be performed on the infarction site by applying the process to the element illustrated in the element list 50 out of all the elements. For example, based on the element list 50, the myocardial model display unit 120 may display the three-dimensional model of the heart in a case where the infarction site is resected.

Figure 18:
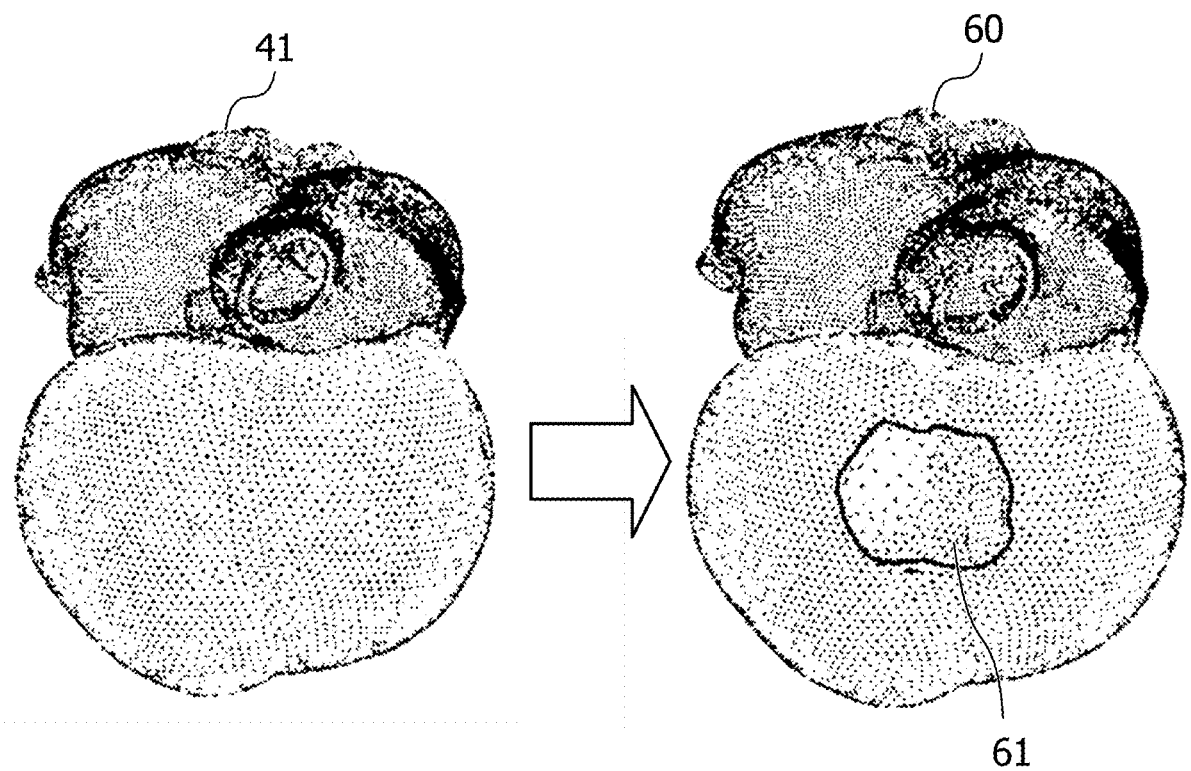
FIG. 18 is a view illustrating a display example of a three-dimensional model in a case where the infarction site is resected.

FIG. 18 is a view illustrating a display example of the three-dimensional model in a case where the infarction site is resected. The myocardial model display unit 120 displays a three-dimensional model 60 after the infarction site specification by excluding the elements illustrated in the element list 50 out of the elements included in the three-dimensional model 41 before the infarction site specification from a display target. The three-dimensional model 60 after the infarction site specification has a shape in which the myocardium of an infarction site resection portion 61 is missing as compared with the three-dimensional model 41 before the infarction site specification.

With the site specifying device 100 described in the second embodiment, convenience is provided to the doctor as follows. 1. It is possible to directly perform the mouse operation to determine the closed region while looking at the heart image with his/her eyes. 2. The depth of the infarction site may be determined by the depth gauge, so that it is not needed to look aside from the displayed three-dimensional model. Moreover, since the depth gauge is set based on the thickness of the myocardium, an error in setting the depth of the infarction site may be suppressed. For example, in a case where it is clear that the infarction site does not reach the inner side of the myocardium, the user may confirm that the bar indicating the depth does not reach 100% of the depth gauge, thereby suppressing the depth of the infarction site from reaching the inner side of the myocardium.

The heart simulator 200 which obtains a specification result of the infarction site may separately change parameters of physical property values such as rigidity and electrical conductivity for elements belonging to the myocardial infarction region. As a result, the heart simulation of the patient suffering from myocardial infarction may be correctly performed. In other words, for example, the infarction element information transmitting unit 160 transmits the element list 50 to the heart simulator 200 as the infarction element information. The heart simulator 200 includes the same three-dimensional model data as the three-dimensional model data 111 in the storage unit 110, and changes the physical property values of the elements illustrated in the element list 50 in the three-dimensional model data to perform the heart simulation.

For example, in the heart, electrical excitation generated from the sinoatrial node is transmitted through the myocardium, so that the atria and ventricles contract. If there is the infarction site in the myocardium, the electrical conductivity at the infarction site decreases, making it difficult to transmit the electrical excitement. Therefore, the heart simulator 200 performs the heart simulation while lowering the electrical conductivity of the elements included in the infarction site. Therefore, the heart simulation according to excitement propagation of the patient suffering from myocardial infarction may be correctly performed. Furthermore, the infarction site is less flexible than other sites. Therefore, the heart simulator 200 may also perform the heart simulation while increasing the rigidity of the elements included in the infarction site.

Note that, as illustrated in FIG. 17, in the element list 50, only the node number of the node included in the region of the infarction site out of the nodes of the respective elements is set. The heart simulator 200 may separate, based on the element list 50, elements that are entirely included in the infarction site and elements that are partially included in the infarction site. Then, the heart simulator 200 may partially apply the physical property value given to the infarction site at the time of the heart simulation, for example, as for the element only partially included in the infarction site.

For example, the heart simulator 200 assumes a case where, only two nodes of the four nodes of the tetrahedral element are included in the infarction site, and the other nodes are not included in the infarction site. In this case, the heart simulator 200 applies the physical property value of the infarction site near the node included in the infarction site of the corresponding element, and applies the physical property value of the normal myocardium near other nodes. Therefore, the correct heart simulation becomes possible. In other words, for example, the fact that the nodes included in the infarction site may be distinguished from the other nodes in the element list 50 contributes to improvement in accuracy of the heart simulation.

Other Embodiments

In the second embodiment, the user specifies the infarction surface region by drawing the closed curve $C_A$ on the myocardial surface in a one-stroke manner using the mouse. However, in this case, there is a case where it is difficult to surround the region with a sharp closed curve. Therefore, the infarction surface region determining unit 130 may also specify the infarction surface region by specifying a control point.

Figure 19:
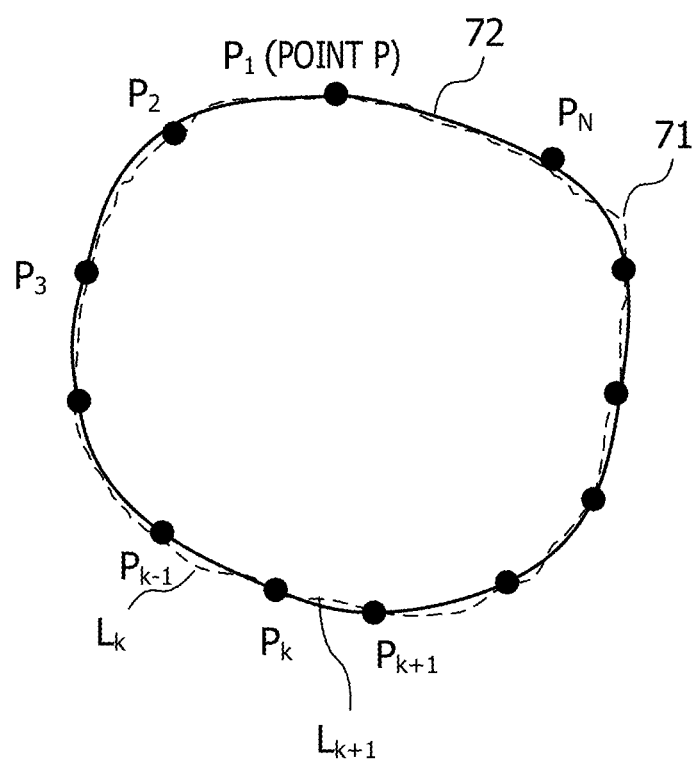
FIG. 19 is a view illustrating an example of generating a closed curve using control points.

FIG. 19 is a view illustrating an example of generating a closed curve using control points. When an infarction surface region determining unit 130 generates the closed curve based on a track of a mouse cursor in a case where the user moves the mouse cursor freehand along an outer periphery of an infarction site, a closed curve 71 indicated by a broken line in FIG. 19 is obtained. In this example, in order to give a doctor a feeling of cutting with a scalpel, an operation of the user to cut while pressing a left click button of a mouse 23 is made an input; however, since the mouse cursor is moved freehand, blurring occurs as indicated by the closed curve 71.

Therefore, the infarction surface region determining unit 130 allows the user to enter the control point when the user desires. For example, the infarction surface region determining unit 130 sets a point P when it enters a scalpel mode as a first control point $P_1$. The user moves the mouse cursor while pressing the left button of the mouse 23 along the outer periphery of the infarction site on the myocardial surface in a three-dimensional model 41 in the scalpel mode. When the mouse cursor reaches a position where the control point is wanted to be arranged, the user presses a right button of the mouse 23. Then, the infarction surface region determining unit 130 sets the control point in the position of the mouse cursor. In a case where N (N is an integer not smaller than one) is set, control points $P_2$, $P_3$, P . . . , $P_N$ are arranged on the surface of the three-dimensional model of the heart (k is an integer not smaller than one and not larger than N).

The infarction surface region determining unit 130 corrects the freehand drawn curve as follows. For example, the infarction surface region determining unit 130 connects (k−1)-th and k-th control points $P_{k−1}$ and $P_k$ with at least a quadratic or higher-order curve $L_k$ to be smoothly continued. In addition, the infarction surface region determining unit 130 similarly connects the k-th and (k+1)-th control points P and $P_{k+1}$ with a smooth curve $L_{k+1}$. At that time, the infarction surface region determining unit 130 makes the curve $L_k$ and the curve $L_{k+1}$ be smoothly continued at the control point $P_k$. In this manner, a closed curve 72 calculated from the control points is obtained.

By calculating the closed curve 72 from the control points, the closed curve 72 having a smooth curve similar to an outer peripheral shape of an actual infarction site may be obtained.

Furthermore, in the second embodiment, it is described assuming that the depth of the infarction site is fixed, but there also is a case where the depth of the infarction site varies depending on locations. In this case, the user may specify the infarction site having different depths depending on the locations by performing an operation on the infarction site having the different depths twice or more.

Figure 20:
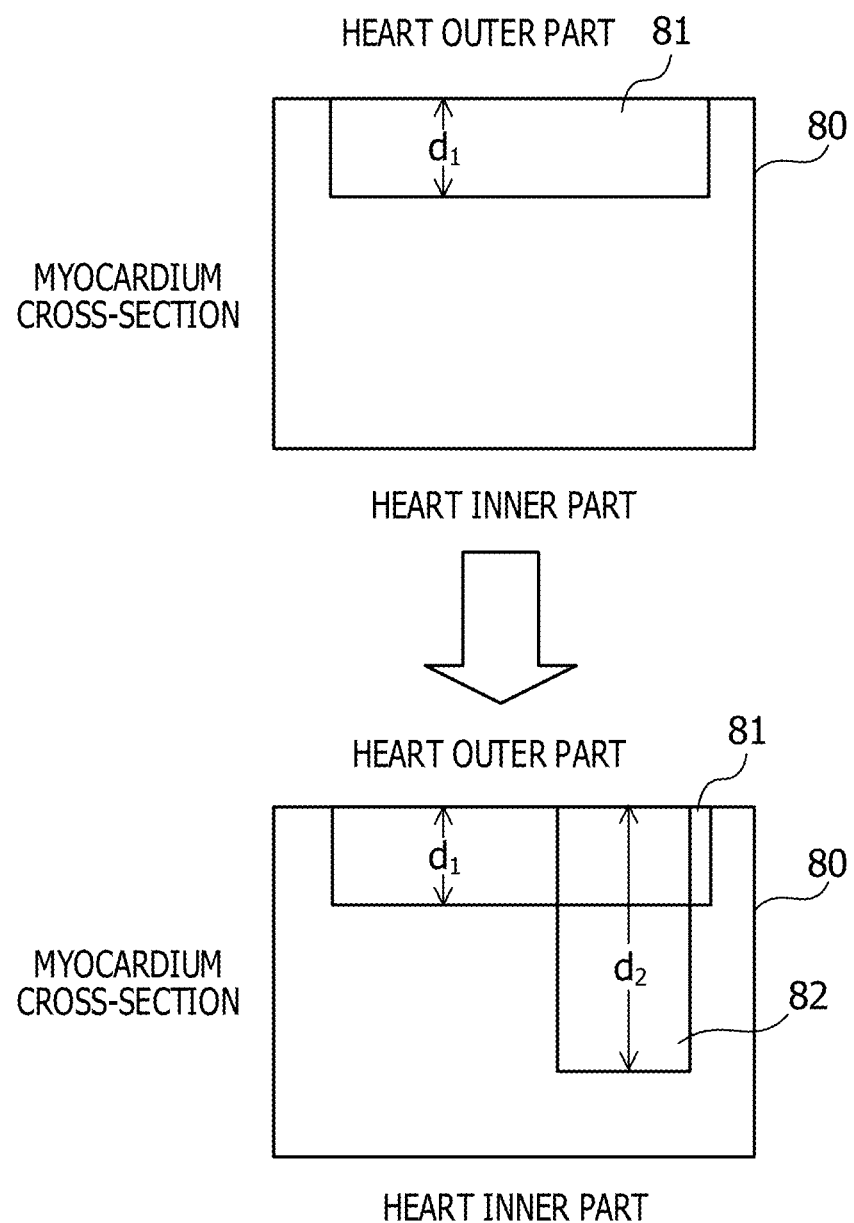
FIG. 20 is a view illustrating an example of specifying the infarction site having different depths.

FIG. 20 is a view illustrating an example of specifying the infarction site having the different depths. FIG. 20 illustrates a state of a cross-section of a three-dimensional model 80 of the myocardium every time the infarction site is specified.

For example, the user first specifies the infarction site at an infarction depth $d_1$. As a result, a closed region 81 in the three-dimensional model 80 is determined by a site specifying device 100. Next, the user specifies the infarction site at an infarction depth $d_2$. Accordingly, a second closed region 82 in the three-dimensional model 80 is determined by the site specifying device 100.

The site specifying device 100 sets a region obtained by combining the closed regions 81 and 82 determined in two times as the infarction site. Therefore, for example, the site specifying device 100 may generate the three-dimensional model 80 obtained by resecting the infarction site having the different depths depending on the locations.

Figure 21:
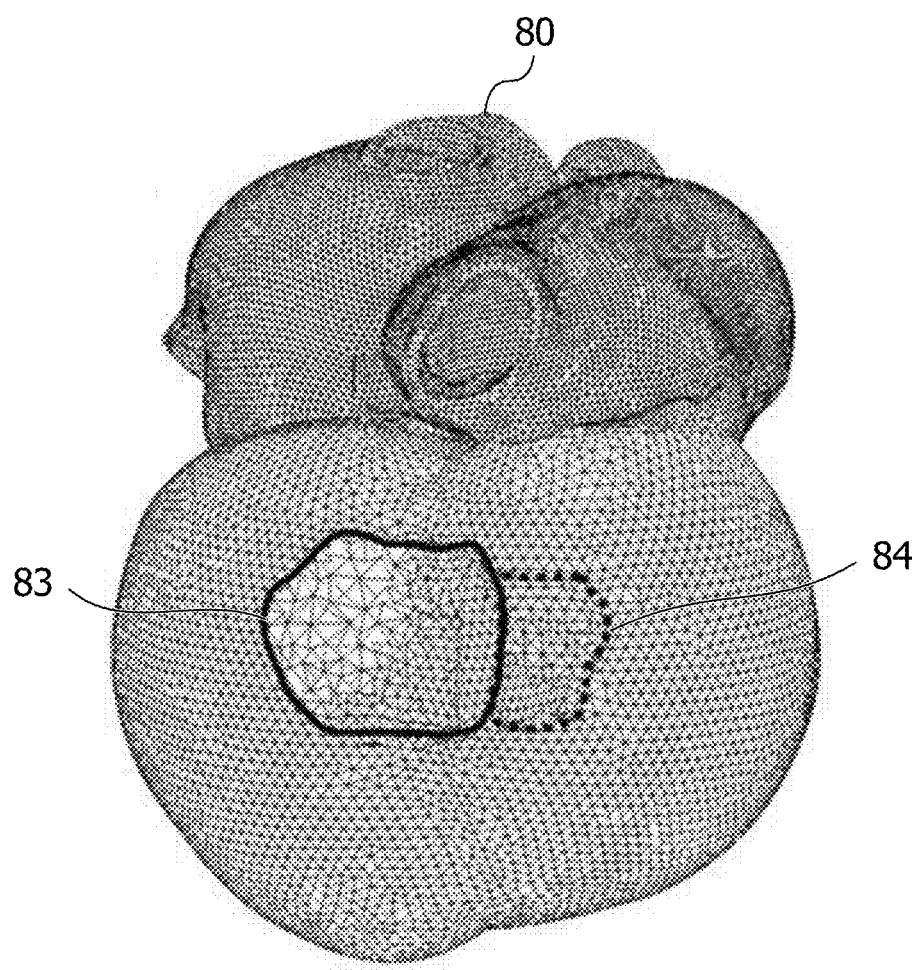
FIG. 21 is a view illustrating an example of the three-dimensional model obtained by resecting the infarction site having different depths.

FIG. 21 is a view illustrating an example of the three-dimensional model obtained by resecting the infarction site having different depths. The three-dimensional model 80 includes two infarction site resected portions 83 and 84. The infarction site resected portions 83 and 84 are portions obtained by cutting the infarction site in two times from the myocardial surface at different depths.

By specifying the infarction site in a plurality of times as described above, it is possible to specify the infarction site having the different depths depending on the locations. For example, when specifying the infarction region at a small depth $d_1$ in a first infarction region, preparing a small region (second infarction region) in the first closed curved surface, and setting the portion at a depth $d_2(>d_1)$, only the second infarction region is set at the depth $d_2$. Therefore, even in a case where the depth of the infarction site varies depending on the locations, the shape of the infarction site may be correctly specified.

Note that, in the example described above, the infarction site of the heart is specified; however, the site specifying device 100 may specify a site having a specific physical property for a three-dimensional model of not only the heart but also various objects. In other words, for example, the site specifying device 100 may specify in the three-dimensional model of an arbitrary object a region of a site of the object at a correct depth. For example, the site specifying device 100 may specify a region having a certain depth from the surface using the three-dimensional model at the time of designing an automobile or an electric appliance. By inputting information indicating the region of the site obtained by such specification to a simulation device regarding the automobile or the electric appliance, a simulation device may perform a simulation by changing a physical property value of the region to a value different from other values.

The embodiments are illustrated as described above, but the configuration of each portion described in the embodiments may be replaced with another having the similar function. Furthermore, other arbitrary components and steps may be added. Moreover, any two or more configurations (features) of the above-described embodiments may be combined.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A site specifying device, comprising:
a memory; and
a processor coupled to the memory and the processor configured to:
store three-dimensional model data indicating a three-dimensional model of an object;
display an appearance of the three-dimensional model of the object based on the three-dimensional model data;
in response to displaying of the appearance of the three-dimensional model of the object, receive a first input and a second input, the first input being an input that draws a closed curve on an outer surface of the displayed object in the appearance of the three-dimensional model by a pointer operation performed by a user, the closed curve defining a region of the outer surface of the displayed object, the outer surface of the displayed object being a part of the displayed object in the appearance of the three-dimensional model and not a cross section of the displayed object, the second input being an input indicating a ratio of a depth at the region defined by the closed curve drawn by the first input, the ratio of the depth corresponding to a value obtained by dividing the depth from the region arranged on the outer surface of the object toward a thickness direction of the three-dimensional model of the object by a thickness between the outer surface and an inner surface of the object in the region-defined by the closed curve drawn by the first input;

calculate, for each point in the region defined by the closed curve drawn on the outer surface of the object, the thickness of the three-dimensional model in the thickness direction between the outer surface and the inner surface of the object, the thickness direction being a normal direction in the outer surface corresponding to the region;

calculate, for each point in the region, the depth toward the inner surface of the object from the outer surface of the object by multiplying the calculated thickness of the three-dimensional model by the ratio indicated in the second input;

select, based on the calculated depth and the closed curve, a portion from the three-dimensional model, the selected portion being a part of the three-dimensional model and corresponding to a volume specified by both of the closed curve drawn by the first input and the depth calculated for each point in the region.

2. The site specifying device according to claim 1, wherein the receiving of the second input is configured to
display a bar indicating the ratio to be used to calculate the depth,
change a length of the bar according to a rotational amount of a mouse wheel, and
receive the second input by determining the ratio according to the length of the bar.

3. The site specifying device according to claim 1, wherein
the three-dimensional model data represents the three-dimensional model by a set of polyhedral elements, and
the processor is configured to output a list of elements included in the selected portion from the three-dimensional model data.

4. The site specifying device according to claim 3, wherein
the three-dimensional model data represents the three-dimensional model by a plurality of nodes positions of which in a three-dimensional space are set, and a set of polyhedral elements in which nodes indicating positions of vertices are set, and
the processor is configured to generate a sphere a radius of which equals to a distance of the depth centered on each of the nodes included in the region, and includes an element including a node in the sphere in the list.

5. The site specifying device according to claim 4, wherein the processor is configured to:
generate a normal line that passes through each of a plurality of points on the closed curve, and
include the element included in the sphere and included in a closed region surrounded by a surface provided between adjacent normal lines and the surface of the three-dimensional model in the list.

6. The site specifying device according to claim 1, wherein the processor is configured to
output information indicating that the selected portion has a property different from the property of other parts in the object.

7. A site specifying method executed by a computer, the site specifying method comprising:
displaying an appearance of a three-dimensional model of an object based on three-dimensional model data indicating the three-dimensional model of the object;
in response to displaying of the appearance of the three-dimensional model of the object, receive a first input and a second input, the first input being an input that draws a closed curve on an outer surface of the displayed object in the appearance of the three-dimensional model by a pointer operation performed by a user, the closed curve defining a region of the outer surface of the displayed object, the outer surface of the displayed object being a part of the displayed object in the appearance of the three-dimensional model and not a cross section of the displayed object, the second input being an input indicating a ratio of a depth at the region defined by the closed curve drawn by the first input, the ratio of the depth corresponding to a value obtained by dividing the depth from the region arranged on the outer surface of the object toward a thickness direction of the three-dimensional model of the object by a thickness between the outer surface and an inner surface of the object in the region-defined by the closed curve drawn by the first input;
calculating, for each point in the region defined by the closed curve drawn on the outer surface of the object, the thickness of the three-dimensional model in the thickness direction between the outer surface and the inner surface of the object, the thickness direction being a normal direction in the outer surface corresponding to the region;
calculating, for each point in the region, the depth toward the inner surface of the object from the outer surface of the object by multiplying the calculated thickness of the three-dimensional model by the ratio indicated in the second input;
selecting, based on the calculated depth and the closed curve, a portion from the three-dimensional model, the selected portion being a part of the three-dimensional model and corresponding to a volume specified by both of the closed curve drawn by the first input and the depth calculated for each point in the region.

8. A non-transitory computer-readable storage medium storing a program that causes a computer to execute a process, the process comprising:
displaying an appearance of a three-dimensional model of an object based on three-dimensional model data indicating the three-dimensional model of the object;
in response to displaying of the appearance of the three-dimensional model of the object, receive a first input and a second input, the first input being an input that draws a closed curve on an outer surface of the displayed object in the appearance of the three-dimensional model by a pointer operation performed by a user, the closed curve defining a region of the outer surface of the displayed object, the outer surface of the displayed object being a part of the displayed object in the appearance of the three-dimensional model and not a cross section of the displayed object, the second input being an input indicating a ratio of a depth at the region defined by the closed curve drawn by the first input, the ratio of the depth corresponding to a value obtained by dividing the depth from the region arranged on the outer surface of the object toward a thickness direction of the three-dimensional model of the object by a thickness between the outer surface and an inner surface of the object in the region-defined by the closed curve drawn by the first input;

calculating, for each point in the region defined by the closed curve drawn on the outer surface of the object, the thickness of the three-dimensional model in the thickness direction between the outer surface and the inner surface of the object, the thickness direction being a normal direction in the outer surface corresponding to the region;

calculating, for each point in the region, the depth toward the inner surface of the object from the outer surface of the object by multiplying the calculated thickness of the three-dimensional model by the ratio indicated in the second input;

selecting, based on the calculated depth and the closed curve, a portion from the three-dimensional model, the selected portion being a part of the three-dimensional model and corresponding to a volume specified by both of the closed curve drawn by the first input and the depth calculated for each point in the region.

9. The storage medium according to claim 8, wherein the receiving of the second input includes
displaying a bar indicating the ratio to be used to calculate the depth,
changing a length of the bar according to a rotational amount of a mouse wheel, and
receiving the second input by determining the ratio according to the length of the bar.

10. The storage medium according to claim 8, wherein the three-dimensional model data represents the three-dimensional model by a set of polyhedral elements, and the process further comprising
outputting a list of elements included in the selected portion from the three-dimensional model data.

11. The storage medium according to claim 10, wherein the three-dimensional model data represents the three-dimensional model by a plurality of nodes positions of which in a three-dimensional space are set, and a set of polyhedral elements in which nodes indicating positions of vertices are set, and
the outputting includes:
generating a sphere a radius of which equals to a distance of the depth centered on each of the nodes included in the region, and
including an element including a node in the sphere in the list.

12. The storage medium according to claim 11, wherein the selecting includes:
generating a normal line that passes through each of a plurality of points on the closed curve, and
including the element included in the sphere and included in a closed region surrounded by a surface provided between adjacent normal lines and the surface of the three-dimensional model in the list.

13. The storage medium according to claim 8, wherein the outputting includes outputting information indicating that the selected portion has a property different from the property of other parts in the object.

* * * * *